(12) United States Patent
Ahn et al.

(10) Patent No.: US 12,174,666 B2
(45) Date of Patent: Dec. 24, 2024

(54) DISPLAY DEVICE

(71) Applicant: Samsung Display Co., Ltd., Yongin-si (KR)

(72) Inventors: Jaeho Ahn, Asan-si (KR); Beomjin Kim, Asan-si (KR); Taewoong Kim, Seongnam-si (KR); Jin Hwan Choi, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/836,172

(22) Filed: Jun. 9, 2022

(65) Prior Publication Data

US 2023/0088689 A1    Mar. 23, 2023

(30) Foreign Application Priority Data

Sep. 23, 2021  (KR) .......................... 10-2021-0125953

(51) Int. Cl.
*G06F 1/16* (2006.01)
(52) U.S. Cl.
CPC .......... *G06F 1/1652* (2013.01); *G06F 1/1656* (2013.01); *G06F 1/1675* (2013.01)
(58) Field of Classification Search
CPC ..... G06F 1/1652; G06F 1/1656; G06F 1/1675
See application file for complete search history.

(56) References Cited

U.S. PATENT DOCUMENTS

| 8,516,728 | B2 | | 8/2013 | Jung | |
|---|---|---|---|---|---|
| 9,286,812 | B2 | * | 3/2016 | Bohn | ...................... H10K 50/84 |
| 9,519,313 | B2 | * | 12/2016 | Kim | ........................ G06F 1/166 |
| 9,823,697 | B2 | * | 11/2017 | Hsu | ........................ G06F 1/1624 |
| 9,864,412 | B2 | * | 1/2018 | Park | ...................... G06F 1/1652 |
| 10,193,095 | B2 | * | 1/2019 | Seo | ........................ H10K 50/11 |
| 10,201,103 | B2 | * | 2/2019 | Kim | ...................... B21B 39/008 |
| 10,289,164 | B2 | | 5/2019 | Seo et al. | |
| 10,321,583 | B2 | * | 6/2019 | Seo | ........................ G06F 1/1624 |
| 10,448,521 | B2 | * | 10/2019 | Seo | ...................... H05K 1/0203 |
| 10,485,116 | B2 | * | 11/2019 | Kim | ........................ G06F 1/1641 |
| 10,499,515 | B2 | | 12/2019 | Lee | |
| 10,506,726 | B2 | | 12/2019 | Kang et al. | |
| 10,553,135 | B2 | * | 2/2020 | Lee | .......................... G06F 3/147 |
| 10,602,623 | B1 | * | 3/2020 | Myers | ................... G06F 1/1652 |
| 10,674,617 | B2 | * | 6/2020 | Lin | ........................... B32B 5/22 |

(Continued)

FOREIGN PATENT DOCUMENTS

| CN | 112530295 A | 3/2021 |
|---|---|---|
| KR | 101227644 B1 | 1/2013 |

(Continued)

*Primary Examiner* — Rockshana D Chowdhury
(74) *Attorney, Agent, or Firm* — CANTOR COLBURN LLP

(57) ABSTRACT

A display device includes a housing, a display module, a support film, and a frame. The display module is accommodated in the housing in a first state and unrolled from the housing to a first direction in a second state. The support film is accommodated in the housing in the first state and unrolled from the housing to the first direction in the second state to support the display module. The frame shrinks to a first shape in the first state and expands to a second shape in the second state in a way such that the frame applies a tensile stress to the support film in the second state.

25 Claims, 29 Drawing Sheets

(56) References Cited

U.S. PATENT DOCUMENTS

| | | | |
|---|---|---|---|
| 10,684,714 B2* | 6/2020 | Seo | G06F 1/3218 |
| 10,743,429 B2 | 8/2020 | Choi | |
| 10,789,863 B2* | 9/2020 | Song | H05K 1/189 |
| 10,985,333 B2* | 4/2021 | Kim | H10K 50/84 |
| 11,037,472 B2* | 6/2021 | Park | G09F 9/301 |
| 11,127,323 B2* | 9/2021 | Kim | G06F 1/1652 |
| 11,212,927 B2* | 12/2021 | Zhu | G09F 9/301 |
| 11,262,803 B2* | 3/2022 | Pyo | G06F 1/1652 |
| 11,269,380 B2* | 3/2022 | Cho | G09F 9/301 |
| 11,270,606 B2* | 3/2022 | Kwon | H05K 5/0017 |
| 11,315,443 B2* | 4/2022 | Han | G06F 1/1624 |
| 11,395,415 B2* | 7/2022 | Gu | G06F 1/1601 |
| 11,455,913 B2* | 9/2022 | Kwon | H10K 50/8426 |
| 11,521,520 B2* | 12/2022 | Han | G09F 9/301 |
| 11,521,521 B2* | 12/2022 | Chung | G09F 11/21 |
| 11,625,070 B2* | 4/2023 | Kang | G06F 1/1652 361/820 |
| 11,670,199 B2* | 6/2023 | Kang | G06F 1/1652 361/679.01 |
| 11,699,366 B2* | 7/2023 | Song | G06F 1/1652 361/679.01 |
| 2013/0058063 A1* | 3/2013 | O'Brien | G06F 1/1624 361/807 |
| 2014/0247544 A1 | 9/2014 | Ryu | |
| 2016/0216737 A1* | 7/2016 | Hayk | G06F 1/1626 |
| 2017/0156225 A1* | 6/2017 | Heo | G06F 1/1681 |
| 2018/0070466 A1* | 3/2018 | Kim | B65H 16/06 |
| 2020/0035133 A1* | 1/2020 | Pyo | F16M 13/02 |
| 2020/0201394 A1* | 6/2020 | Choi | H05K 5/0017 |
| 2021/0007230 A1* | 1/2021 | Kang | H05K 5/03 |
| 2021/0083024 A1* | 3/2021 | Song | H10K 77/111 |
| 2021/0090476 A1* | 3/2021 | Kang | G09F 9/301 |
| 2021/0149085 A1* | 5/2021 | Eom | G02F 1/1345 |
| 2021/0201716 A1* | 7/2021 | Pyo | G09F 9/301 |
| 2021/0352809 A1* | 11/2021 | Kim | H10K 77/111 |
| 2021/0373603 A1* | 12/2021 | Feng | G06F 1/1624 |
| 2021/0378115 A1* | 12/2021 | Li | G06F 1/1652 |
| 2022/0029124 A1* | 1/2022 | Kang | H10K 59/8791 |
| 2022/0141978 A1* | 5/2022 | Yoon | H05K 5/0017 361/807 |
| 2022/0155823 A1* | 5/2022 | Shin | G09F 9/301 |
| 2022/0166861 A1* | 5/2022 | Lim | G06F 1/1681 |
| 2022/0189347 A1* | 6/2022 | Oh | G09F 9/301 |
| 2022/0272852 A1* | 8/2022 | Park | G06F 1/1652 |
| 2022/0404873 A1* | 12/2022 | Seki | G09F 9/301 |
| 2023/0075243 A1* | 3/2023 | Song | G06F 1/1624 |

FOREIGN PATENT DOCUMENTS

| | | |
|---|---|---|
| KR | 101636753 B1 | 7/2016 |
| KR | 101780419 B1 | 10/2017 |
| KR | 1020170139732 A | 12/2017 |
| KR | 1020180130076 A | 12/2018 |
| KR | 1020190004618 A | 1/2019 |
| KR | 102019509 B1 | 9/2019 |
| KR | 1020200034277 A | 3/2020 |
| KR | 1020200048729 A | 5/2020 |

* cited by examiner

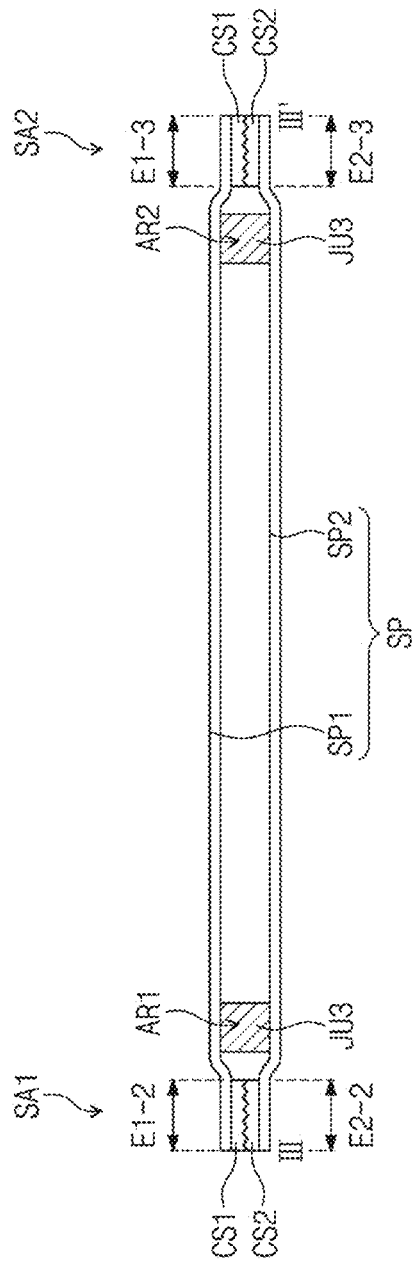

DISPLAY DEVICE

This application claims priority to Korean Patent Application No. 10-2021-0125953, filed on Sep. 23, 2021, and all the benefits accruing therefrom under 35 U.S.C. § 119, the content of which in its entirety is hereby incorporated by reference.

BACKGROUND

1. Field

The disclosure relates to a display device. More particularly, the disclosure relates to a rollable display device.

2. Description of the Related Art

Electronic devices, such as smartphones, tablet computers, notebook computers, car navigation units, and smart televisions, are being developed. The electronic devices may include a display device to provide information.

Various types of display devices are being developed to satisfy the user experience and the user interface. Among such display devices, flexible display devices are being actively developed.

SUMMARY

Embodiments of the disclosure provide a display device having improved resistance against an external pressure.

Embodiments of the invention provide a display device including a housing, a display module accommodated in the housing in a first state and unrolled from the housing to a first direction in a second state, a support film accommodated in the housing in the first state and unrolled from the housing to the first direction in the second state to support the display module, and a frame shrinking to a first shape in the first state and expanding to a second shape in the second state in a way such that the frame applies a tensile stress to the support film in the second state.

In an embodiment, the tensile stress may be applied in the first direction and a second direction crossing the first direction.

In an embodiment, the support film may include a first film and a second film spaced apart from the first film with the frame interposed therebetween and disposed farther from the display module than the first film is.

In an embodiment, the frame may include a first support frame disposed in the housing in the second state and extending in the second direction crossing the first direction, a second support frame disposed outside the housing in the second state and spaced apart from the first support frame in the first direction, a first arm connecting a first side of the first support frame to a first side of the second support frame, and a second arm connecting a second side of the first support frame to a second side of the second support frame, and a distance in the first direction between the first support frame and the second support frame increases by the first arm and the second arm when the first state is changed from the first state to the second state.

In an embodiment, each of the first arm and the second arm may include first to n-th joint units, and joint units adjacent to each other among the first to n-th joint units may be rotatably coupled to each other, where n is a natural number equal to or greater than 2.

In an embodiment, an internal angle defined by an (i+1)-th joint unit and an (i+2)-th joint unit among the first to n-th joint units may be greater than about 180 degrees, and an internal angle defined by an i-th joint unit and the (i+1)-th joint unit among the first to n-th joint units may be smaller than about 180 degrees in the first state, where i is a natural number equal to or greater than 1 and equal to or less than n−2.

In an embodiment, each of the first to n-th joint units may be aligned parallel to the first direction in the second state.

In an embodiment, each of the first arm and the second arm may include first to n-th joint units, and an i-th joint unit among the first to n-th joint units may be coupled to an (i−1)-th joint unit to be movable in the first direction in the second state where n is a natural number equal to or greater than 2, and i is a natural number equal to or greater than 2 and equal to or less than n.

In an embodiment, a first slit may be defined in the first support frame, the first joint unit may be coupled to the first slit to be movable, a second slit may be defined in the second support frame, and the n-th joint unit may be coupled to the second slit to be movable.

In an embodiment, the first slit may extend in a first crossing direction crossing the first direction and the second direction, the second slit may extend in a second crossing direction crossing the first direction, the second direction and the first crossing direction, and a distance between the first slit and the second slit may decrease as a distance from a center of the first support frame increases.

In an embodiment, an edge area of the first film and an edge area of the second film, which are disposed outside the second support frame in the first direction, may be coupled to each other in the first state and the second state.

In an embodiment, A first edge area of the first film and a first edge area of the second film, which are disposed outside the first arm in the second direction, may be separated from each other in the first state and are coupled to each other in the second state, and a second edge area of the first film and a second edge area of the second film, which are disposed outside the second arm in the second direction, may be separated from each other in the first state and are coupled to each other in the second state In an embodiment, the display device may further include a first coupling structure disposed in the first edge area of the first film and a second coupling structure disposed in the first edge area of the second film, and the first coupling structure and the second coupling structure may be separated from each other in the first state and be coupled to each other in the second state.

In an embodiment, the first coupling structure and the second coupling structure may be separated from each other by the first support frame when a state of the support film is changed from the second state to the first state.

In an embodiment, a length in the second direction of the first support frame may be greater than a length in the second direction of the first film, and the first support frame may be installed in the housing.

In an embodiment, a first edge area of the first film and a first edge area of the second film, which are adjacent to the second support frame in the first direction, may be coupled to each other in the first state and the second state, a second edge area of the first film and a second edge area of the second film, which are disposed outside the first arm in the second direction, may be coupled to each other in the first state and the second state, and a third edge area of the first film and a third edge area of the second film, which are disposed outside the second arm in the second direction, may be coupled to each other in the first state and the second state.

In an embodiment, the display device may further include a third support frame to fix the first support frame to the housing, a cutting line may be defined in the second film to be aligned with the third support frame, the second film may include a first area and a second area arranged with the cutting line interposed therebetween in the second direction, and the first area and the second area may be separated from each other in the first state and coupled to each other in the second state.

In an embodiment, the display device may further include a first coupling structure disposed in the first area and a second coupling structure disposed in the second area, and the first coupling structure and the second coupling structure may be separated from each other in the first state and are coupled to each other in the second state.

In an embodiment, the first coupling structure and the second coupling structure may be separated from each other by the third support frame when a state of the second film is changed from the second state to the first state.

In an embodiment, the display device may further include a third support frame which fixes the first support frame to the housing, and an opening area may be defined in the second film, and the third support frame may be disposed in the opening area.

In an embodiment, the display device may further include first coupling structures coupled to the support film, and the frame may include a first support frame disposed in the housing in the second state and extending in a second direction crossing the first direction, a second frame disposed outside the housing in the second state and spaced apart from the first support frame in the first direction, a first arm connecting a first side of the first support frame to a first side of the second support frame, a second arm connecting a second side of the first support frame to a second side of the second support frame, and second coupling structures respectively disposed in the first arm and the second arm, a distance in the first direction between the first support frame and the second frame may increase by the first arm and the second arm when the first state is changed to the second state, and the first coupling structures may be respectively coupled to the second coupling structures in the second state.

In an embodiment, the support film may include a first edge area and a second edge area opposite to the first edge area in the second direction, the first coupling structures may include a metal layer disposed in the first edge area and the second edge area, and the second coupling structures may include a magnet or an electromagnet.

In an embodiment, each of the first film and the second film may include a plastic, metal, or fiber material.

In an embodiment, the display device may further include a roller installed in the housing, and the support film may be wound on the roller in the first state.

In an embodiment, the display module may be wound on the roller in the first state.

In an embodiment, the roller may include a first roller and a second roller, the support film may be wound on the first roller in the first state, and the display module may be wound on the second roller in the first state.

According to embodiments of the invention, the frame applies a tensile stress to the support film when the display module is unrolled and flat. In such embodiment, as a tension of the support film increases due to the tensile stress, the support force of the support film when the display module is unrolled and flat is improved such that the display module is effectively prevented from being deformed even when a touch event occurs on the display module by a user.

In such embodiments, differently from a multi-joint supporter or a support block, the support film does not apply a local compressive stress to the display module when the display module is wound on the roller. Thus, defects related to the surface quality caused by the deformation of the display module are effectively prevented.

BRIEF DESCRIPTION OF THE DRAWINGS

The above and other features of the invention will become more apparent by describing in further detail embodiments thereof with reference to the accompanying drawings, in which:

FIG. 3C is a cross-sectional view taken along line III-III' of FIG. 2C;

DETAILED DESCRIPTION

Figure 1A:
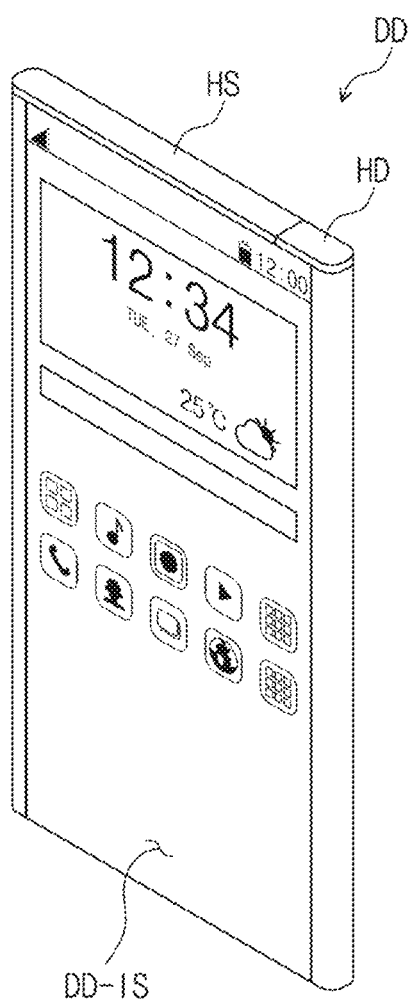
FIG. 1A is a perspective view of a display device according to an embodiment of the disclosure.
Figure 1A:
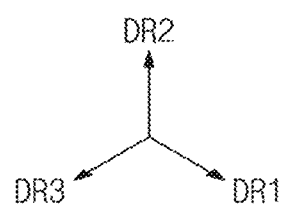

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the disclosure, it will be understood that when an element (or area, layer, or portion) is referred to as being "on", "connected to" or "coupled to" another element or layer, it can be directly on, connected or coupled to the other element or layer or intervening elements or layers may be present. In contrast, when an element is referred to as being "directly on" another element, there are no intervening elements present.

Like numerals refer to like elements throughout. In the drawings, the thickness, ratio, and dimension of components are exaggerated for effective description of the technical content.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the disclosure.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings.

Figure 1B:
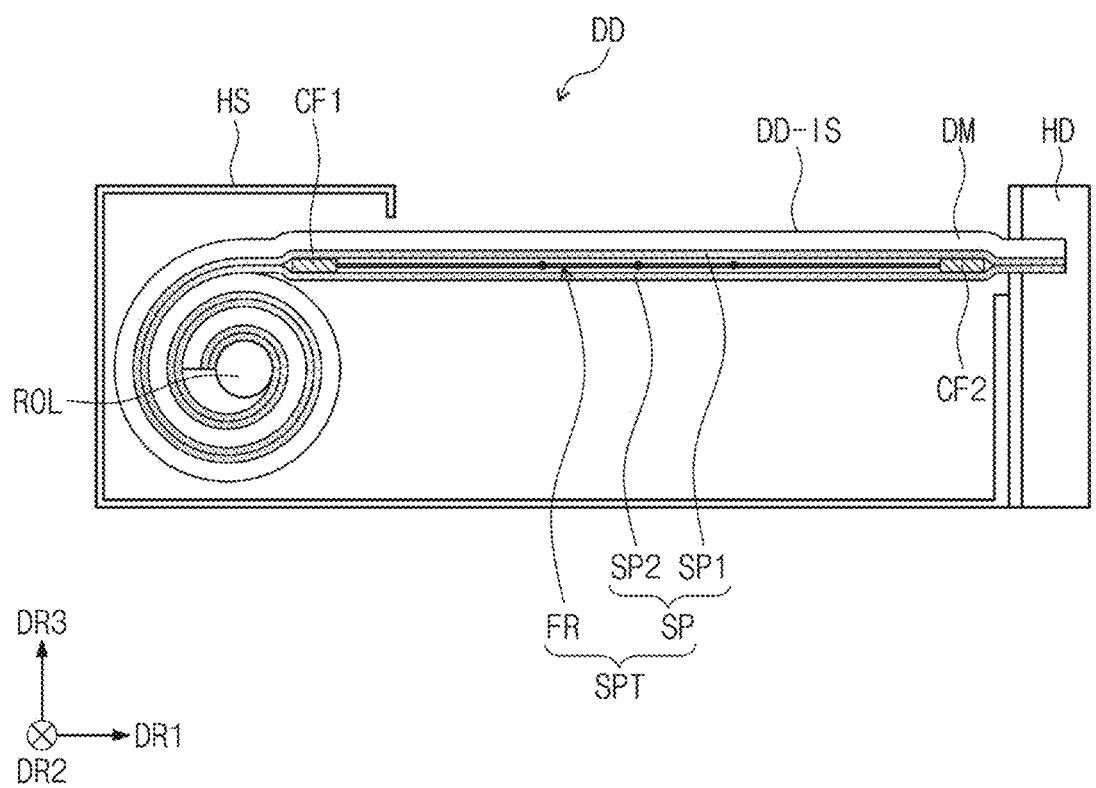
FIG. 1B is a side view of a display device according to an embodiment of the disclosure.
Figure 1C:
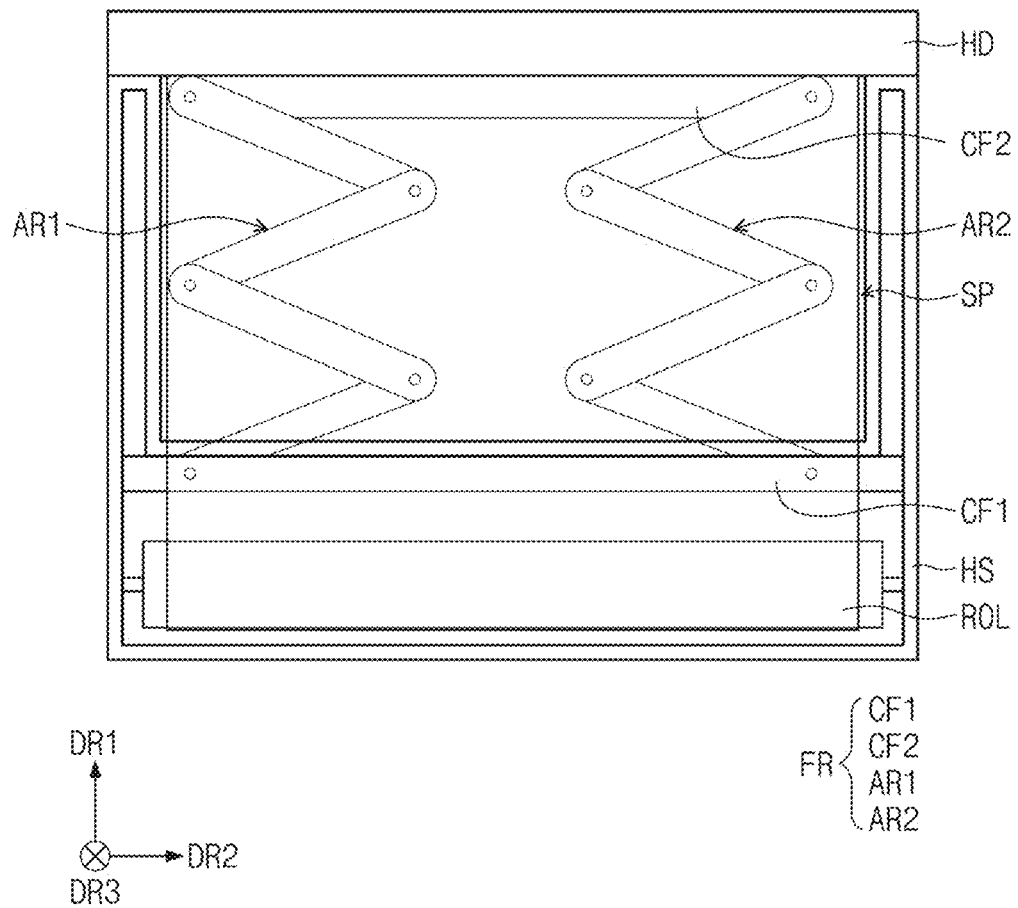
FIG. 1C is a front view of a display device according to an embodiment of the disclosure.
Figure 1D:
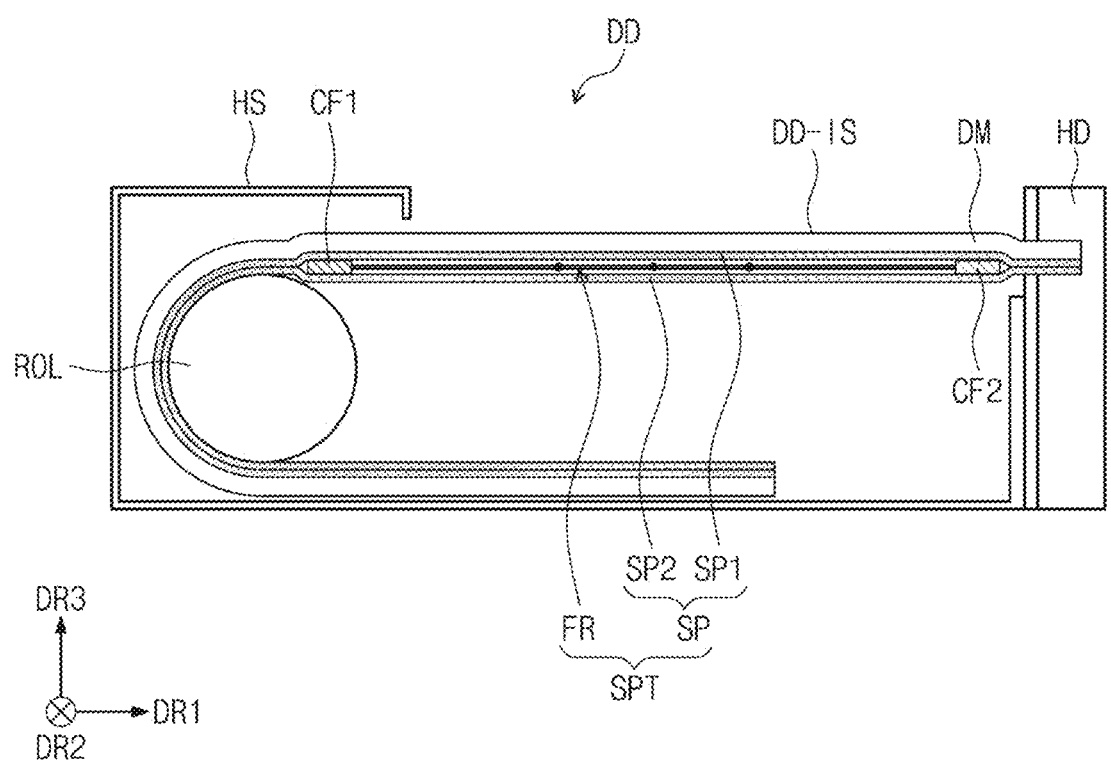
FIG. 1D is a side view of a display device according to an embodiment of the disclosure.

FIG. 1A is a perspective view of a display device DD according to an embodiment of the disclosure. FIG. 1B is a side view of the display device DD according to an embodiment of the disclosure. FIG. 1C is a front view of the display device DD according to an embodiment of the disclosure. FIG. 1D is a side view of the display device DD according to an embodiment of the disclosure.

Referring to FIGS. TA to 1C, an embodiment of the display device DD may include a display module DM, a supporter SPT, a roller ROL, a holder HD, and a housing HS. The display device DD may further include additional components.

FIGS. TA to 1C show an embodiment of the display device DD in a state (hereinafter, referred to as a first state) in which the display module DM is accommodated in the housing HS. A portion of the display module DM of the display device DD may be exposed without being covered by the housing HS in the first state (i.e., when the display device DD is in the first state), but not being limited thereto or thereby. According to an alternative embodiment, the display module DM may be completely inserted into the housing HS in the first state.

In a state (hereinafter, referred to as a second state) in which the display module DM is fully unfolded, the display module DM exposed without being covered by the housing HS may provide a flat display surface DD-IS. The display surface DD-IS may be parallel to a plane defined by a first directional axis DR1 and a second directional axis DR2. A third directional axis DR3 may indicate a normal line direction of the display surface DD-IS, i.e., a thickness direction of the display module DM. Front (or upper) and rear (or lower) surfaces of each member are distinguished from each other by the third directional axis DR3.

The display module DM may include an organic light emitting display panel or an inorganic light emitting display panel. The display module DM may further include a touch panel disposed on the display panel. The touch panel may be disposed directly on the display panel or may be attached to the display panel by an adhesive layer. Alternatively, the touch panel may be omitted. The display module DM may further include a window disposed on the touch panel. The window may include a plastic or glass material.

The supporter SPT may be disposed on a rear surface of the display module DM and may guide the display module DM operated in the first or second state. The supporter SPT may include a support film SP and a frame FR. The support film SP may be accommodated in the housing HS in the first state, and the support film SP may be unrolled from the housing HS to the first direction DR1 in the second state to support the display module DM. A portion of the support film SP may be accommodated in the housing HS in both of the first state and the second state.

One side of the support film SP may be coupled to the roller ROL in the first direction DR1, and another side (an opposing side) of the support film SP may be coupled to the holder HD in the first direction DR1. The support film SP may include a plurality of films. FIGS. 1B and 1D show an embodiment where a first film SP1 and a second film SP2 are disposed to face each other with the frame FR interposed therebetween. The second film SP2 may be disposed under the frame FR and may be disposed farther from the display module DM than the first film SP1 is.

The support film SP may include a metal, plastic, or fiber material. The support film SP including the metal material may have a thickness equal to or smaller than about 100 micrometers, and the support film SP including the plastic or fiber material may have a thickness equal to or smaller than about 200 micrometers.

The frame FR may shrink to be in a first shape in the first state and may expand to be in a second shape in the second state. The frame FR may include a first support frame CF1, a second support frame CF2, a first arm AR1, and a second arm AR2. The first support frame CF1 may be disposed in the housing HS in both of the first state and the second state. The first support frame CF1 may be fixed to the housing HS. The first support frame CF1 may extend in the second direction DR2 crossing the first direction DR1. The second support frame CF2 may be disposed outside the housing HS at least in the second state. The second support frame CF2 may be spaced apart from the first support frame CF1 in the first direction DR1. The second support frame CF2 may be disposed adjacent to the holder HD. The second support frame CF2 may be coupled to the holder HD.

The first arm AR1 may connect a first side of the first support frame CF1 to a first side of the second support frame CF2, and the second arm AR2 may connect a second side of the first support frame CF1 to a second side of the second support frame CF2. The first side may be spaced apart from the second side in the second direction DR2. When the first state is switched to the second state, each of the first arm AR1 and the second arm AR2 may increase a distance in the first direction DR1 between the first support frame CF1 and the second support frame CF2.

The holder HD may be exposed to the outside of the housing HS in the first state and the second state. In an embodiment, a user may pull the holder HD in the first direction DR1, and thus the supporter SPT and the display module DM may be unrolled from the housing HS. In an embodiment, the display device DD may further include a driving module to unroll or roll the holder HD.

The roller ROL may guide the support film SP and the display module DM when the state of the display device DD is changed. FIG. 1B shows an embodiment where the support film SP and the display module DM are wound on the roller ROL in the first state, however, the disclosure should not be limited thereto or thereby.

In an alternative embodiment, as shown in FIG. 1D, the roller ROL may slide at least one selected from the support film SP and the display module DM to a storage space of the housing HS. As the state of the display device DD is changed from the first state to the second state or vice versa, the roller ROL may slide at least one selected from the support film SP and the display module DM along the first direction DR1. Although not shown in figures, each of the support film SP and the display module DM may be deformed, e.g., folded, in a predetermined structure in the storage space of the housing HS.

Figure 2A:
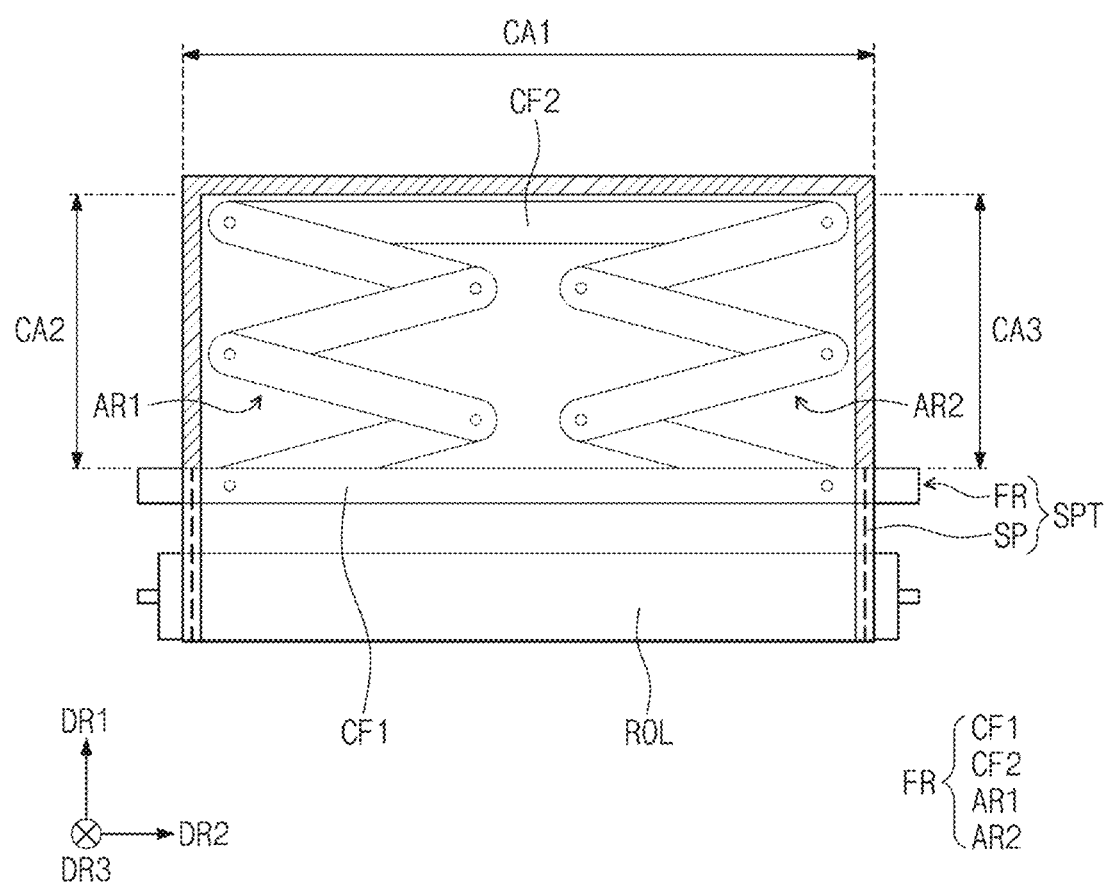
FIGS. 2A to 2C are views showing a change in a state of a supporter according to an embodiment of the disclosure.
Figure 2B:
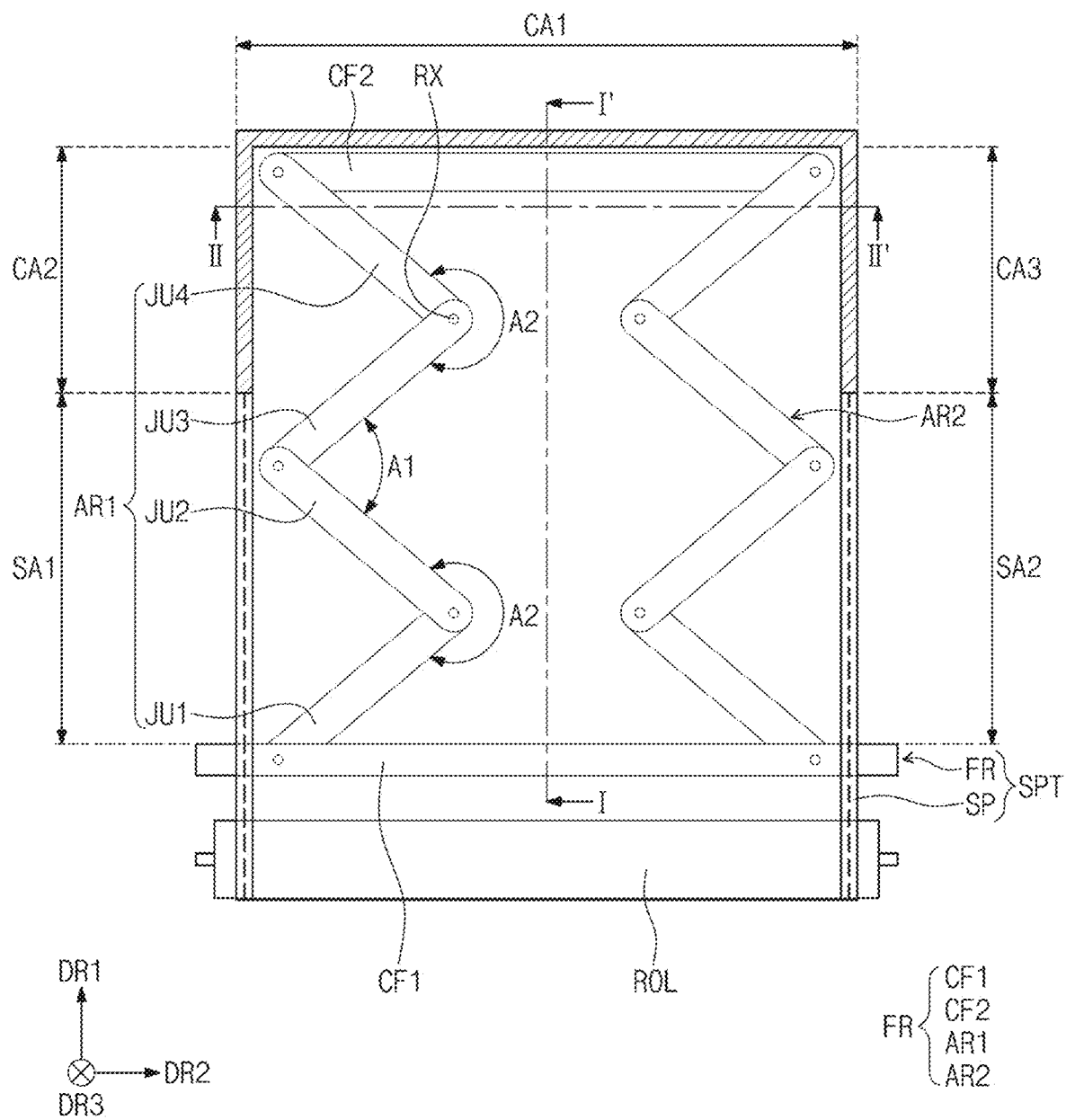
Figure 2C:
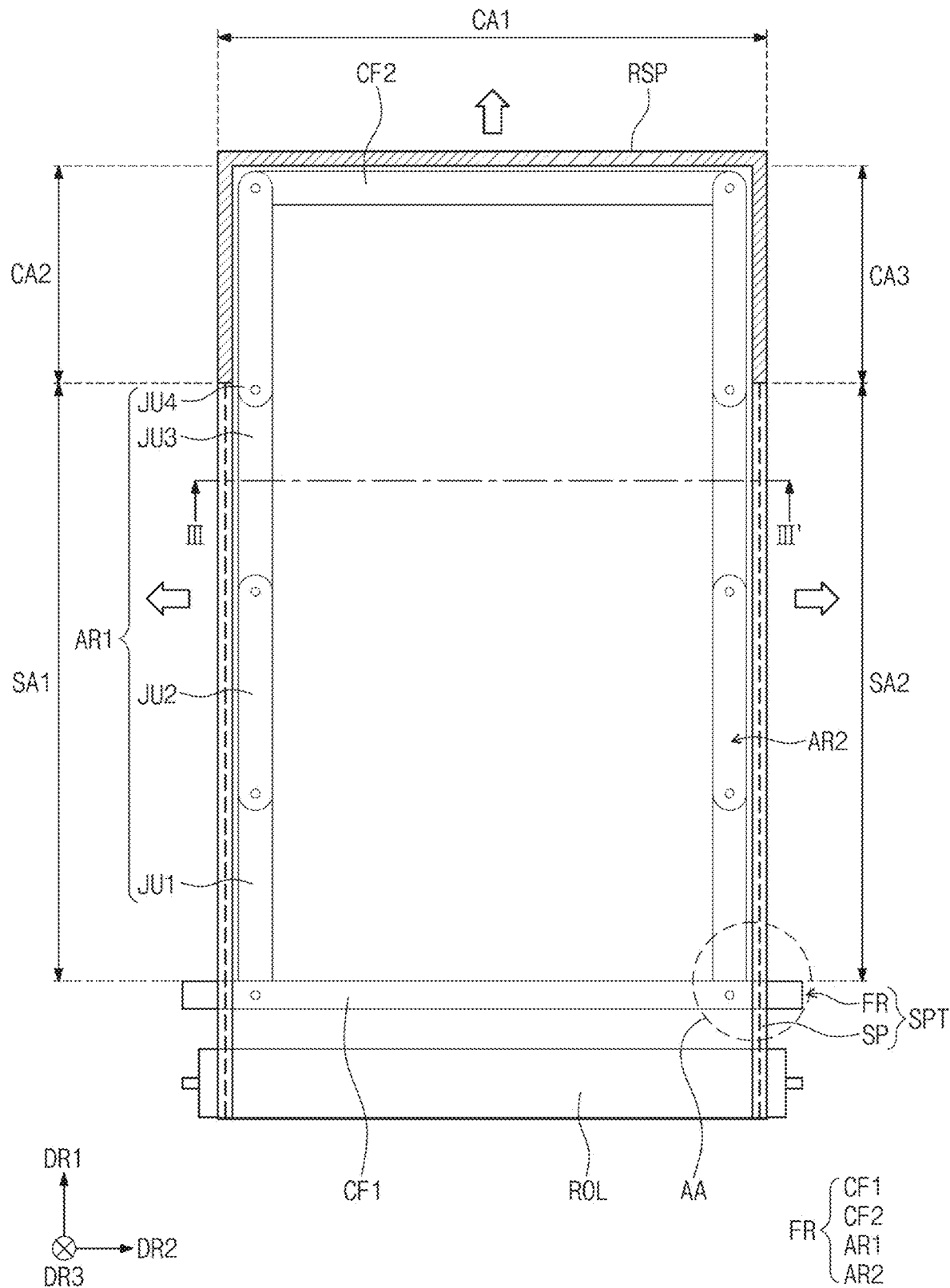
Figure 3A:
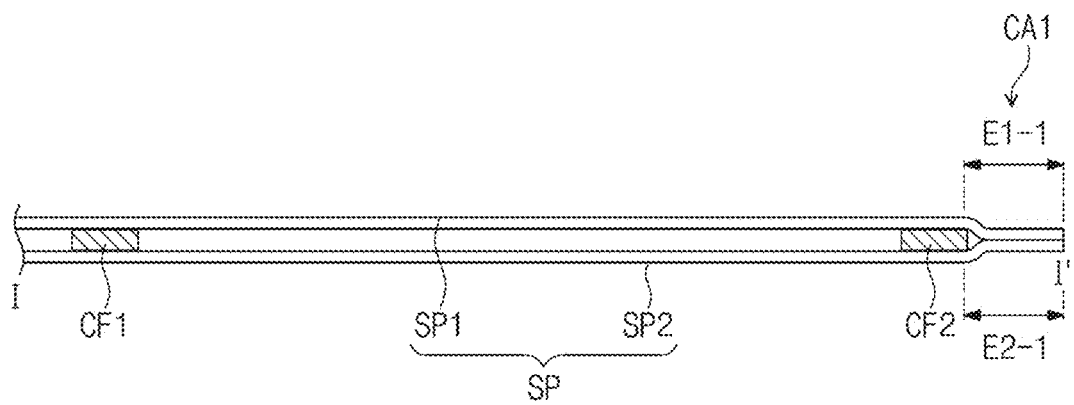
FIG. 3A is a cross-sectional view taken along line I-I' of FIG. 2B.
Figure 3B:
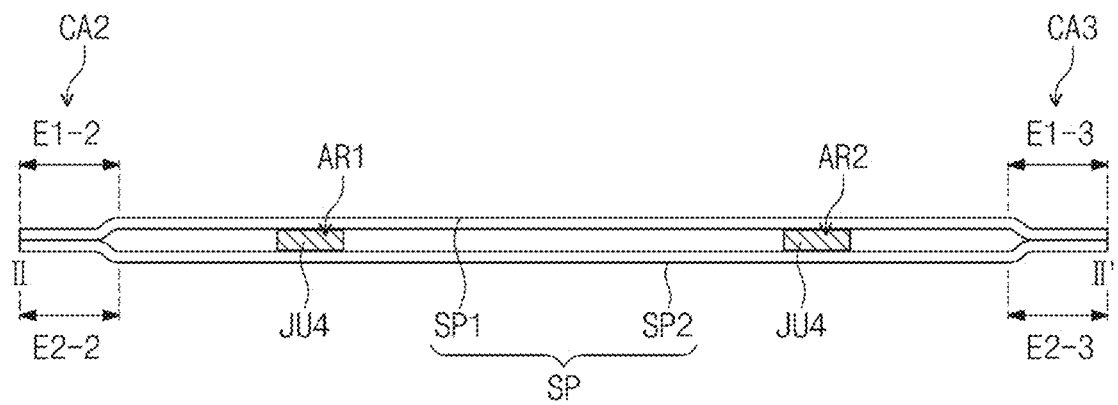
FIG. 3B is a cross-sectional view taken along line II-II' of FIG. 2B.
Figure 3D:
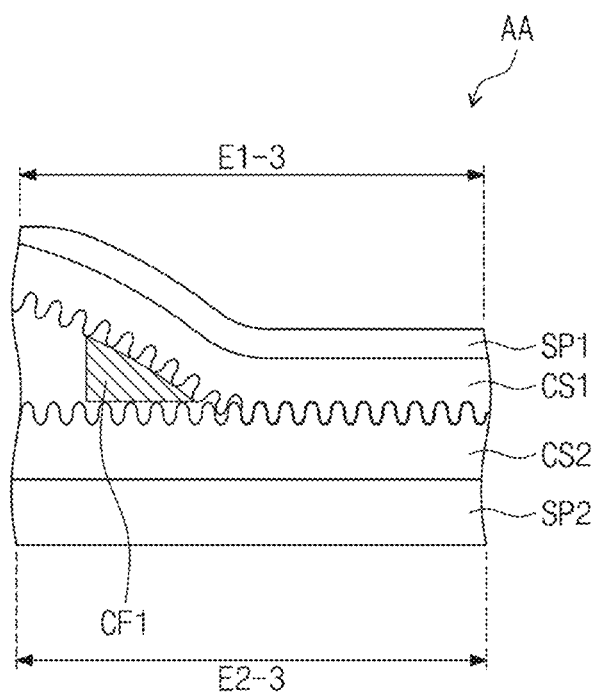
FIG. 3D is a side view of an area corresponding to the encircled portion AA of FIG. 2C.

FIGS. 2A to 2C are views showing a change in a state of the supporter SPT according to an embodiment of the disclosure. FIG. 3A is a cross-sectional view taken along line I-I' of FIG. 2B. FIG. 3B is a cross-sectional view taken along line II-II' of FIG. 2B. FIG. 3C is a cross-sectional view taken along line III-III' of FIG. 2C. FIG. 3D is a side view of an area corresponding to the encircled portion AA of FIG. 2C.

FIG. 2A shows an embodiment of the supporter SPT in the first state, FIG. 2B shows an embodiment of the supporter SPT in a state (hereinafter, referred to as an intermediate state) between the first state and the second state, and FIG. 2C shows an embodiment of the supporter SPT in the second state. For convenience of illustration, some components of the display device DD shown in FIGS. 1A to 1C are not shown in FIGS. 2A to 2C.

Referring to FIGS. 2A and 2B, each of the first arm AR1 and the second arm AR2 may include first to n-th (n is a natural number equal to or greater than 2) joint units JU1 to JUn. In an embodiment, as shown in FIGS. 2A and 2B, n may be 4.

Among the first to fourth joint units JU1 to JU4, joint units adjacent to each other may be rotatably coupled to each other. In an embodiment, a rotational axis RX may be defined or provided to couple the joint units adjacent to each other, as shown in FIG. 2B. In an embodiment, the rotational axis RX may include a metal material, but not being limited thereto.

The first joint unit JU1 may be rotatably coupled to the first support frame CF1, and the fourth joint unit JU4 may be rotatably coupled to the second support frame CF2. The first joint unit JUT may be coupled to the first support frame CF1 by the rotational axis RX, and the fourth joint unit JU4 may be coupled to the second support frame CF2 by the rotational axis RX.

When an internal angle A1 defined by an i-th (i is a natural number equal to or greater than 1) joint unit and an (i+1)-th joint unit among the first to n-th joint units is smaller than about 180 degrees, an internal angle A2 defined by the (i+1)-th joint unit and an (i+2)-th joint unit may be greater than about 180 degrees. In an embodiment, for example, as shown in FIG. 2B, an internal angle A1 defined by a second joint unit JU2 and a third joint unit JU3 may be smaller than about 180 degrees, and an internal angle A2 defined by the third joint unit JU3 and the fourth joint unit JU4 may be greater than about 180 degrees.

Referring to FIGS. 2B and 3A, a first coupling area CA1 of the support film SP may be defined outside the second support frame CF2 in the first direction DR1. In the first coupling area CA1, a first edge area E1-1 of the first film SP1 may be coupled to a first edge area E2-1 of the second film SP2. The first coupling area CA1 may be maintained in the coupling state both in the first state and the second state.

The first edge area E1-1 of the first film SP1 and the first edge area E2-1 of the second film SP2 may be coupled to each other by an adhesive layer (not shown). A coupling method and a coupling structure of the first edge area E1-1 of the first film SP1 and the first edge area E2-1 of the second film SP2 are not particularly limited.

According to an embodiment, the first coupling area CA1 may expand to an area overlapping the second support frame CF2. According to an embodiment, the first coupling area CA1 may be defined only in the area overlapping the second support frame CF2. In an embodiment, each of the first edge area E1-1 of the first film SP1 and the first edge area E2-1 of the second film SP2 may be coupled to the second support frame CF2.

Referring to FIGS. 2B and 3B, a second coupling area CA2 of the support film SP may be defined outside the first arm AR1 in the second direction DR2, and a third coupling area CA3 of the support film SP may be defined outside the second arm AR2 in the second direction DR2. In the second coupling area CA2, a portion of a second edge area E1-2 of the first film SP1 may be coupled to a portion of a second edge area E2-2 of the second film SP2. In the third coupling area CA3, a portion of a third edge area E1-3 of the first film SP1 may be coupled to a portion of a third edge area E2-3 of the second film SP2. The second coupling area CA2 and the third coupling area CA3 may be maintained in the coupled state in both of the first state and the second state of the display device DD, and the coupling method and the coupling structure of the second coupling area CA2 and the third coupling area CA3 are not particularly limited. According to an alternative embodiment, the second coupling area CA2 and the third coupling area CA3 may be omitted.

Here, in describing the edge areas, e.g., the first edge area E1-1, E2-1 the second edge area E1-2, E2-2, and the third edge area E1-3, E2-3, the terms "first, second, and third" are used to distinguish one edge area from another edge area, and the order of the edge areas is not limited by the terms. When any one is defined as the first edge area, another one may be defined as the second edge area, and the other one may be defined as the third edge area.

Referring to FIG. 2C, a first opening/closing area SA1 of the support film SP may be defined outside the first arm AR1 in the second direction DR2, and a second opening/closing area SA2 of the support film SP may be defined outside the second arm AR2 in the second direction DR2. The first opening/closing area SA1 may be continuous from or integrally formed with the second coupling area CA2, and the second opening/closing area SA2 may be continuous from or integrally formed with the third coupling area CA3.

Referring to FIGS. 2C and 3C, the portion of the second edge area E1-2 of the first film SP1 may be coupled to the portion of the second edge area E2-2 of the second film SP2 in the first opening/closing area SA1. The portion of the second edge area E1-2 of the first film SP1 and the portion of the second edge area E2-2 of the second film SP2, which are separated from each other, in the first state shown in FIG. 2A start to be coupled to each other in the intermediate state shown in FIG. 2B. Then, each of the first opening/closing area SA1 and the second opening/closing area SA2 may be completely coupled in the second state shown in FIGS. 2C and 3C. The portion of the third edge area E1-3 of the first film SP1 and the portion of the third edge area E2-3 of the second film SP2, which are separated from each other, in the first state shown in FIG. 2A may be completely coupled to each other in the second state shown in FIGS. 2C and 3C. In an embodiment where the second coupling area CA2 and the third coupling area CA3 are omitted, each of the first opening/closing area SA1 and the second opening/closing area SA2 may extend to the first coupling area CA1.

In an embodiment, as shown in FIG. 3C, a first coupling structure CS1 may be disposed in the second edge area E1-2 of the first film SP1, and a second coupling structure CS2 may be disposed in the second edge area E2-2 of the second film SP2. The first coupling structure CS1 may also be disposed in the third edge area E1-3 of the first film SP1, and the second coupling structure CS2 may also be disposed in the third edge area E2-3 of the second film SP2.

In an embodiment, as shown in FIG. 3D, the first coupling structure CS1 may be a first zipper line, and the second coupling structure CS2 may be a second zipper line that may be coupled to the first zipper line. When the first film SP1 and the second film SP2 are changed from in the second state shown in FIG. 2C to in the first state shown in FIG. 2A, the first coupling structure CS1 may be separated from the second coupling structure CS2 by the first support frame CF1 as shown in FIG. 3D.

In an embodiment, as shown in FIGS. 2A to 2C, a length in the second direction DR2 of the first support frame CF1 may be larger than a length (or width) in the second direction DR2 of the first film SP1. The first support frame CF1 having the larger length may be directly fixed to the housing HS as shown in FIG. 1C.

Although not shown in figures, the frame FR may further include a component that presses the first coupling structure CS1 and the second coupling structure CS2, e.g., a zipper slider. When the first film SP1 and the second film SP2 are changed from in the first state shown in FIG. 2A to in the second state shown in FIG. 2C, the component may press the first coupling structure CS1 and the second coupling structure CS2 to allow protrusions and recesses of the first zipper line to be coupled with recesses and protrusions of the second zipper line.

Referring back to FIG. 2C, in the second state in which the frame FR is completely unrolled, the second support frame CF2 may apply a tensile stress to the first coupling area CA1 of the support film SP along the first direction DR1. In the second state, the first to fourth joint units JU1 to JU4 of each of the first arm AR1 and the second arm AR2 may be arranged parallel to the first direction DR1. The first arm AR1 and the second arm AR2 may respectively apply the tensile stress to the coupled first opening/closing area SA1 and the coupled second opening/closing area SA2 of the support film SP in the second direction DR2.

As the tensile stress is applied along the first direction DR1 and the second direction DR2, the tension of the support film SP may increase. As the tension increases, a support force of the support film SP may be improved. Although a user's touch occurs on the display surface DD-IS (refer to FIG. 1A) in the second state, the display module DM may not be deformed since the support film SP increases the resistance of the display module DM against the external pressure.

Figure 4A:
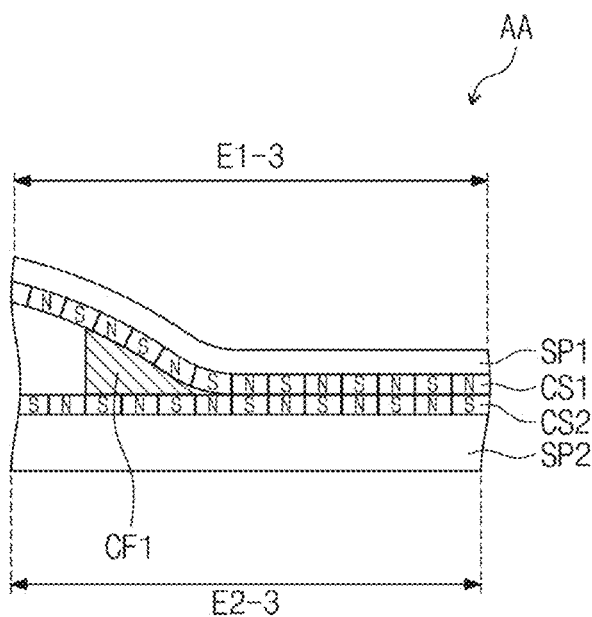
FIG. 4A is a side view of a coupling structure according to an embodiment of the disclosure.
Figure 4B:
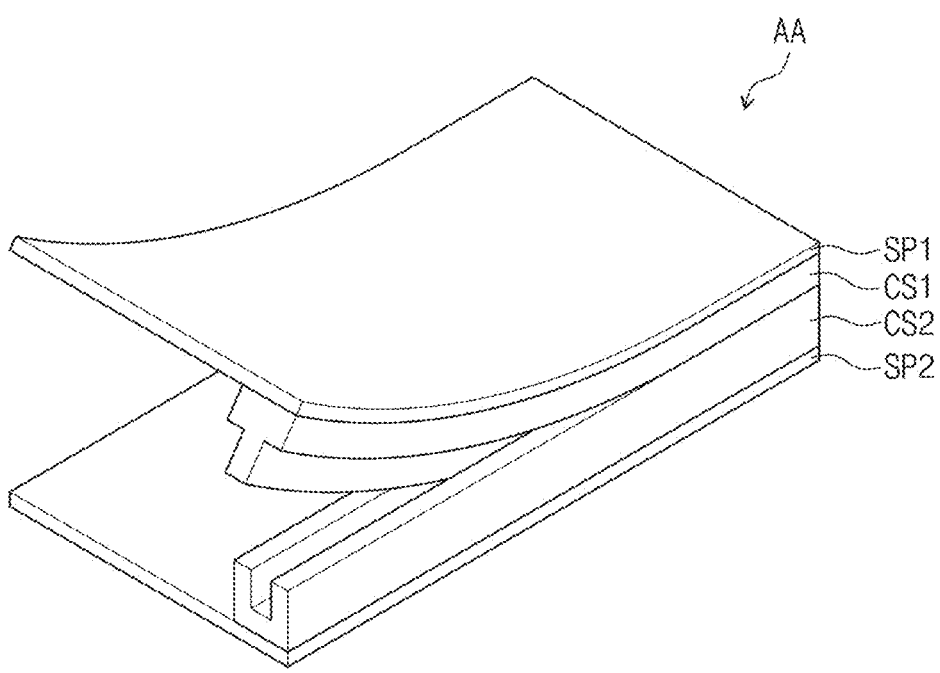
FIG. 4B is a perspective view of a coupling structure according to an embodiment of the disclosure.

FIG. 4A is a side view of a coupling structure according to an embodiment of the disclosure. FIG. 4B is a perspective view of a coupling structure according to an embodiment of the disclosure. Hereinafter, any repetitive detailed descriptions of the same elements as those in FIGS. 3A to 3D will be omitted.

Referring to FIG. 4A, in an embodiment, a first coupling structure CS1 may be a first magnetic line, and a second coupling structure CS2 may be a second magnetic line that may be coupled to the first magnetic line. When the first magnetic line includes an N pole region and an S pole region alternately and repeatedly arranged with the N pole region, the second magnetic line may include the S pole region and the N pole region alternately and repeatedly arranged with the S pole region. In such an embodiment, a component that presses the first coupling structure CS1 and the second coupling structure CS2 may be omitted.

Referring to FIG. 4B, in an alternative embodiment, a first coupling structure CS1 may include a protrusion line, and a second coupling structure CS2 may include a groove line that may be coupled to the protrusion line. In such an embodiment, the frame FR shown in FIGS. 2A to 2C may further include a component that presses the protrusion line and the groove line.

In an alternative embodiment, although not shown in figures, the first coupling structure CS1 and the second coupling structure CS2 may be connected to each other with Velcro® straps. The first coupling structure CS1 may include a velour structure, and the second coupling structure CS2 may include a crochet structure.

Figure 5A:
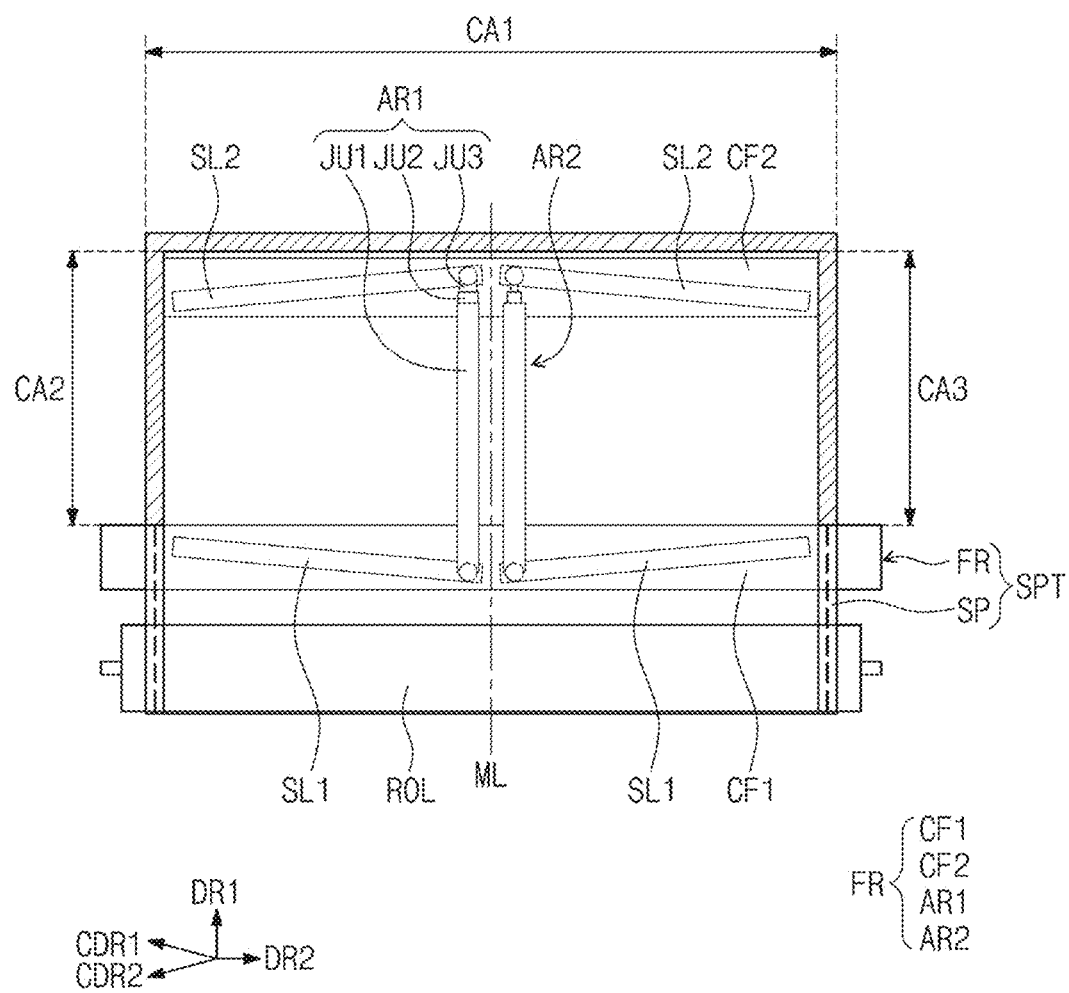
FIGS. 5A to 5C are views showing a change in a state of a supporter according to an embodiment of the disclosure.
Figure 5B:
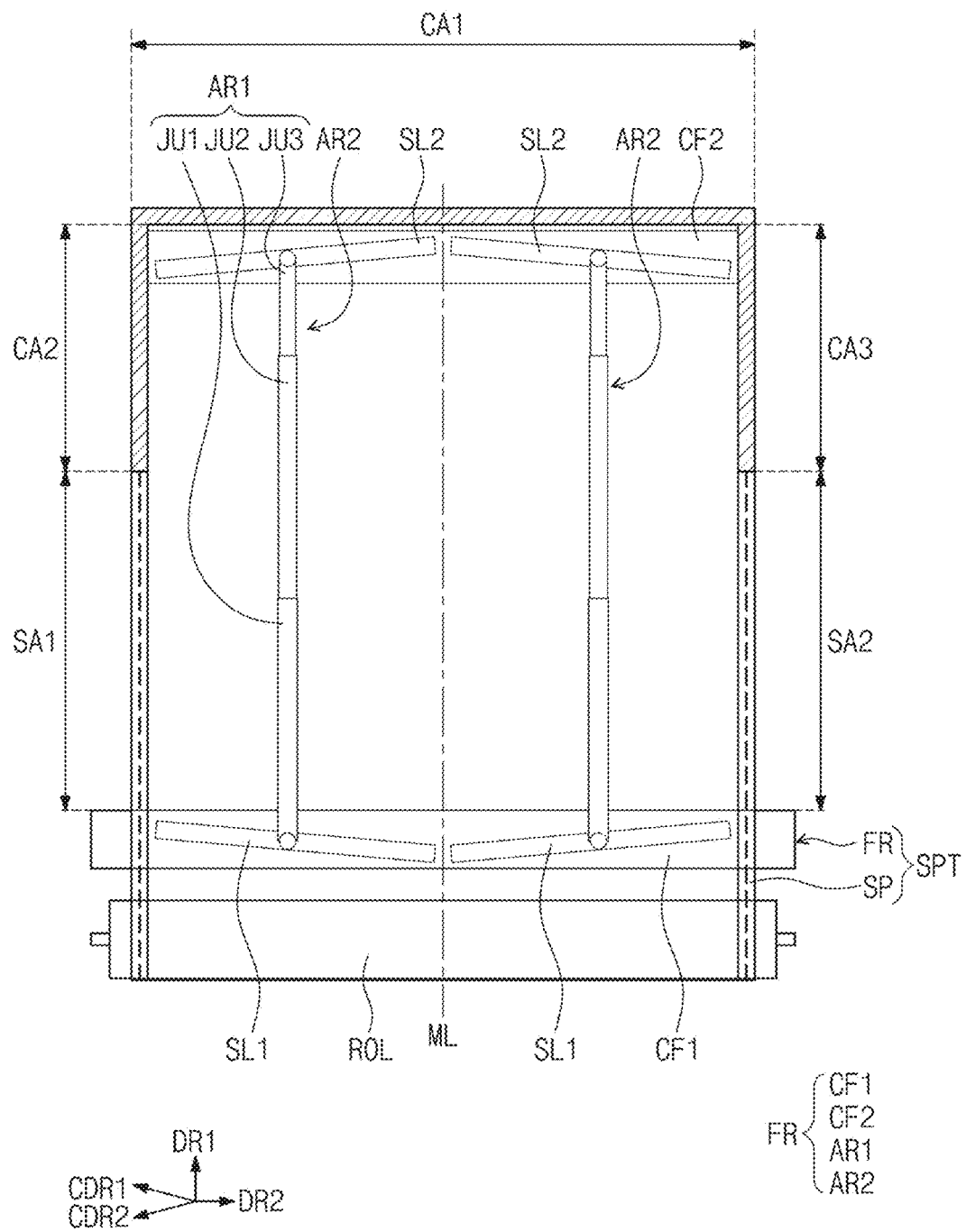
Figure 5C:
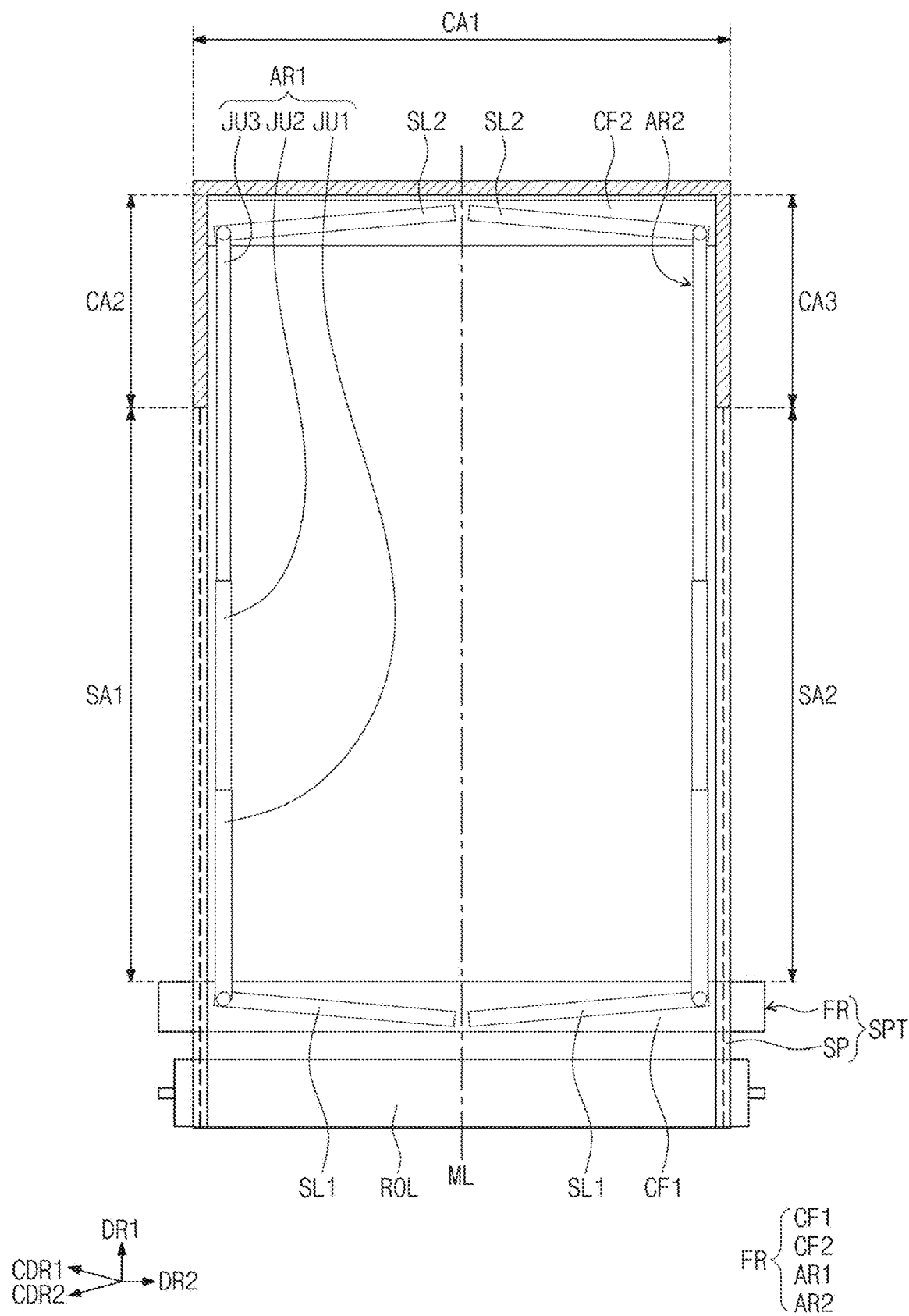

FIGS. 5A to 5C are views showing a change in a state of a supporter SPT according to an embodiment of the disclosure. Hereinafter, any repetitive detailed descriptions of the same elements as those in FIGS. 1A to 4B will be omitted.

Referring to FIGS. 5A to 5C, in an embodiment, each of a first arm AR1 and a second arm AR2 may include first to n-th (n is a natural number equal to or greater than 2) joint units JU1 to JUn. In an embodiment, as shown in FIGS. 5A to 5C, n may be 3. Among the first, second, and third joint units, an i-th (i is a natural number equal to or greater than 2) joint unit may be coupled to an (i−1)-th joint unit to be movable in the first direction DR1. In a first state, the second and third joint units JU2 and JU3 may be inserted into the first joint unit JU1. In a second state, the second joint unit JU2 may be slid out of the first joint unit JU1 and then may be fixed to an end of the first joint unit JU1. The third joint unit JU3 that moves in a similar way to the second joint unit JU2, may be fixed to an end of the second joint unit JU2.

A coupling relation of the first arm AR1 with respect to a first support frame CF1 and a second support frame CF2 and a coupling relation of the second arm AR2 with respect to the first support frame CF1 and the second support frame CF2 are symmetrical to each other with respect to a center line ML parallel to the first direction DR1, and thus, the first arm AR1 will be mainly described.

A first slit SL1 may be defined in the first support frame CF1, and the first joint unit JU1 may be coupled to the first slit SL1 to be movable. A second slit SL2 may be defined in the second support frame CF2, and the third joint unit JU3 may be coupled to the second slit SL2 to be moveable.

The first slit SL1 may extend in a first crossing direction CDR1 crossing the first direction DR1 and the second direction DR2, and the second slit SL2 may extend in a second crossing direction CDR2 crossing the first direction DR1, the second direction DR2, and the first crossing direction CDR1. A distance between the first slit SL1 and the second slit SL2 may decrease as a distance from a center of the first support frame CF1 increases.

In such an embodiment, as shown in FIG. 5A, the first arm AR1 may be disposed in an area of the first slit SL1 closest to the center of the first support frame CF1 in the first state. In the second state shown in FIG. 5C following an intermediate state shown in FIG. 5B, the first arm AR1 may be disposed in an area of the first slit SL1 farthest from the center of the first support frame CF1.

As described with reference to FIG. 2C, the first arm AR1 and the second arm AR2 shown in FIG. 5C may apply a tensile stress to each of the first opening/closing area SA1 and the second opening/closing area SA2 of the support film SP.

Figure 6A:
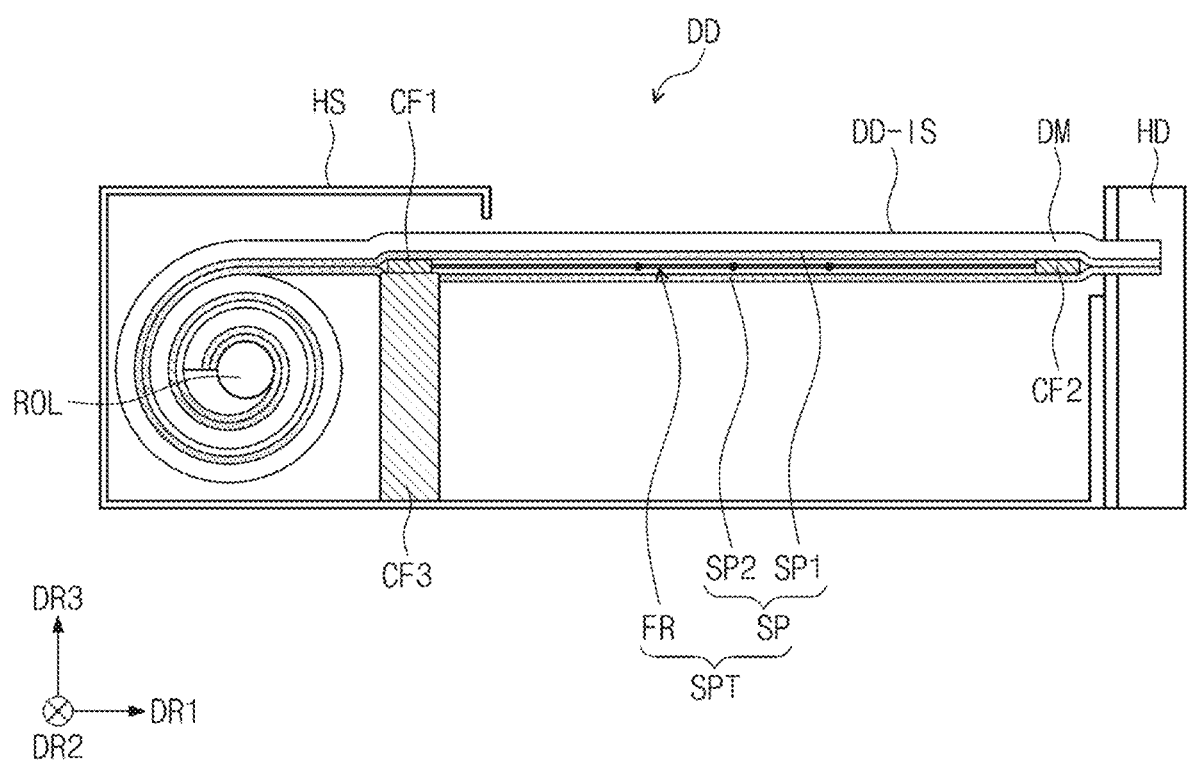
FIG. 6A is a side view of a display device according to an embodiment of the disclosure.
Figure 6B:
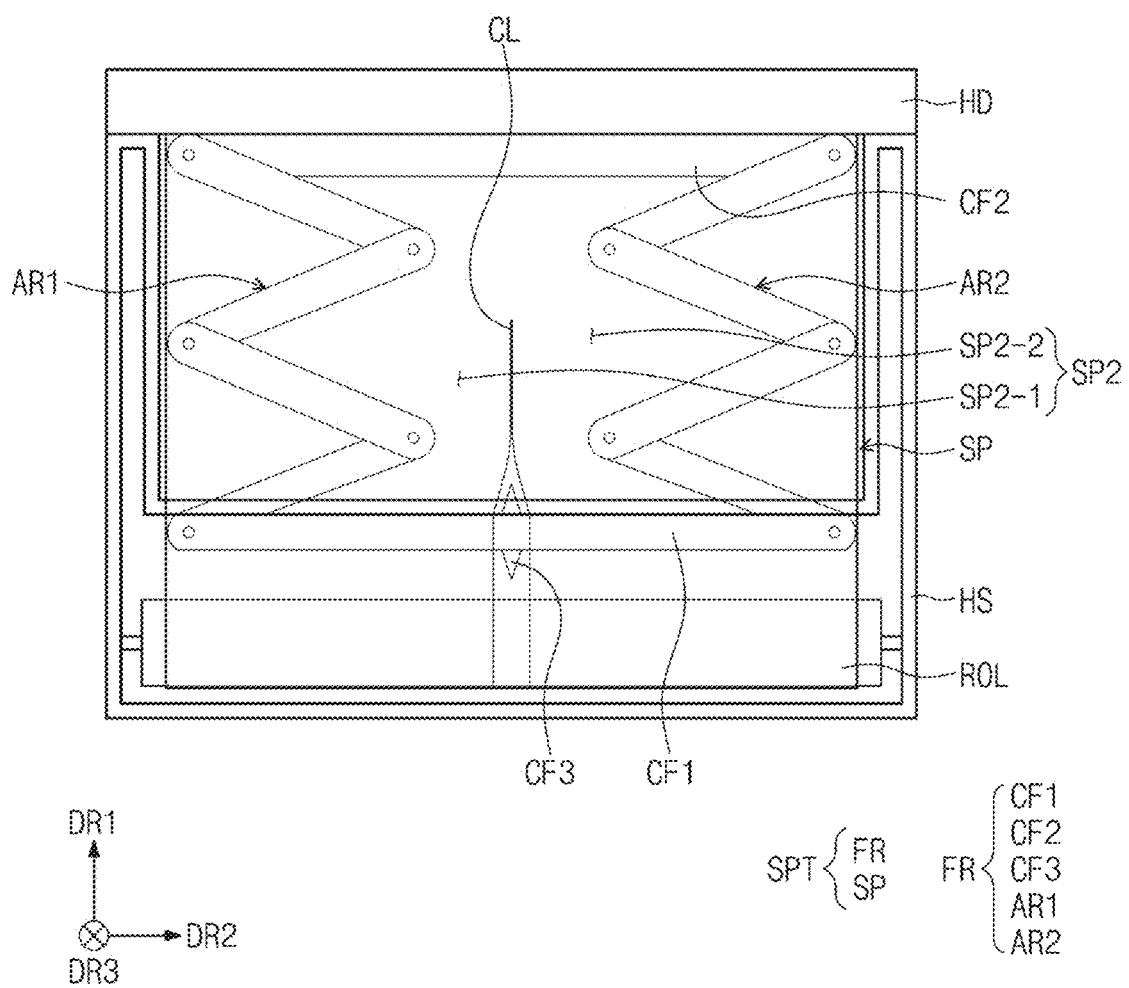
FIG. 6B is a front view of a display device according to an embodiment of the disclosure.

FIG. 6A is a side view of a display device DD according to an embodiment of the disclosure, and FIG. 6B is a front view of the display device DD according to an embodiment of the disclosure. Hereinafter, any repetitive detailed descriptions of the same elements as those of FIGS. 7A to 5C will be omitted.

Referring to FIG. 6A, in an embodiment, a frame FR may further include a third support frame CF3 that couples a first support frame CF1 to a housing HS. The third support frame CF3 may extend in the third direction DR3 and may be fixed to the housing HS. The third support frame CF3 may be provided in plural.

Referring to FIG. 6B, a length in the second direction DR2 of the first support frame CF1 may be reduced compared with the first support frame CF1 shown in FIG. 1C. The length in the second direction DR2 of the first support frame CF1 may be smaller than a length (or width) in the second direction DR2 of a support film SP. A function of separating the coupling structure of the first support frame CF1 described with reference to FIG. 3D may be performed by the third support frame CF3. This will be described in detail later.

A cutting line CL may be defined in a second film SP2. The cutting line CL may be defined at a position aligned with the third support frame CF3 in the second direction DR2 and may extend in the first direction DR1. The second film SP2 may include a first area SP2-1 and a second area SP2-2, which are disposed with the cutting line CL interposed therebetween in the second direction DR2.

Figure 7A:
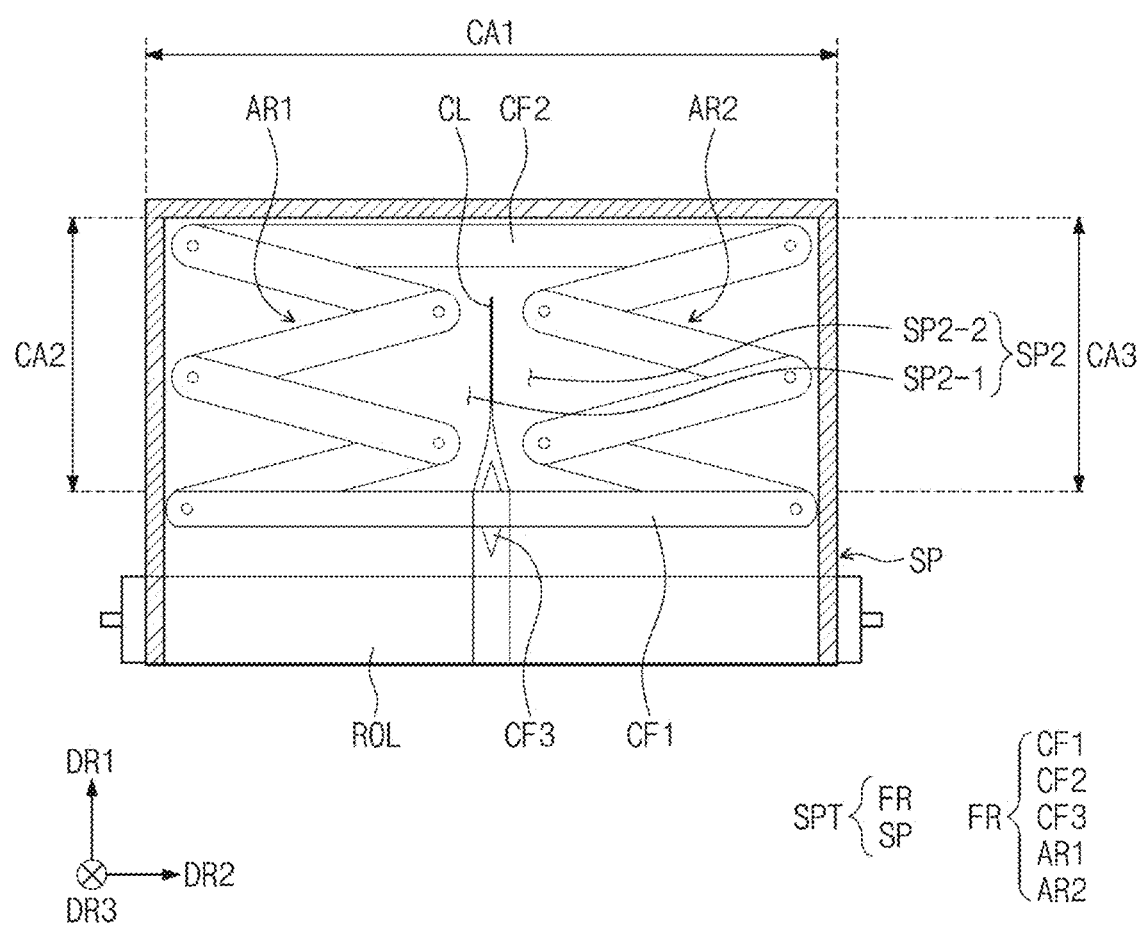
FIGS. 7A to 7C are views showing a change in a state of a supporter according to an embodiment of the disclosure.
Figure 7B:
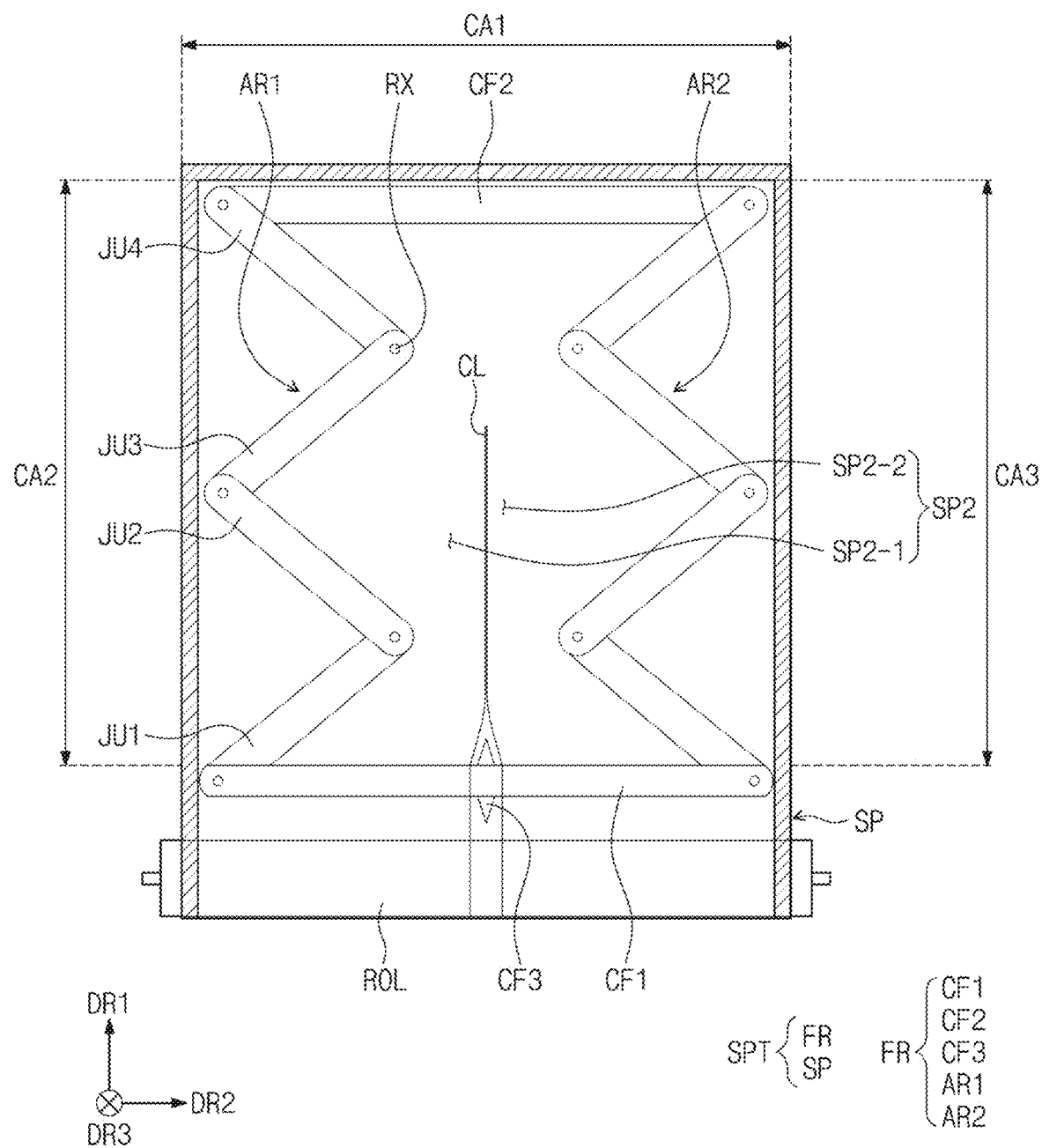
Figure 7C:
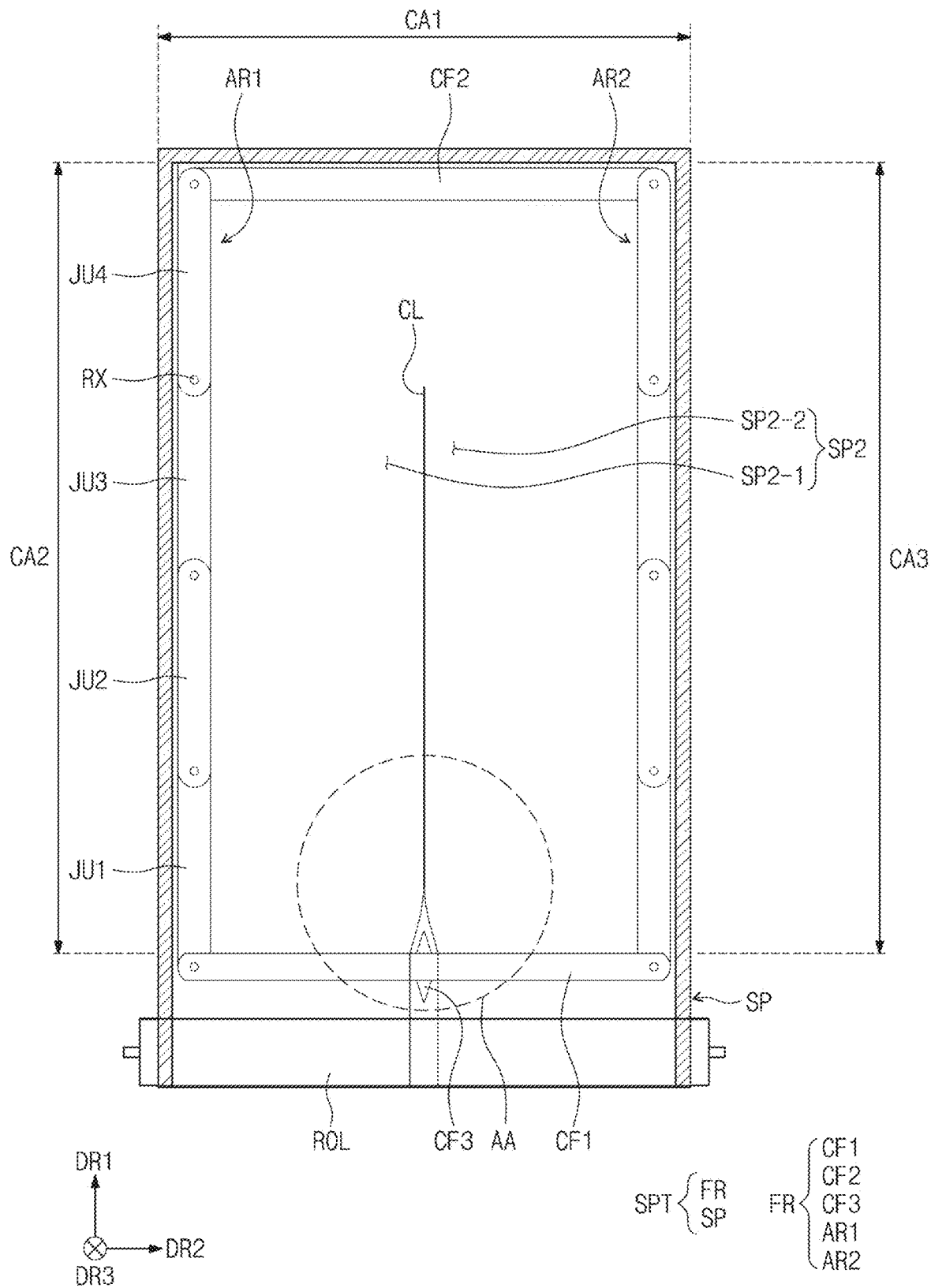
Figure 7D:
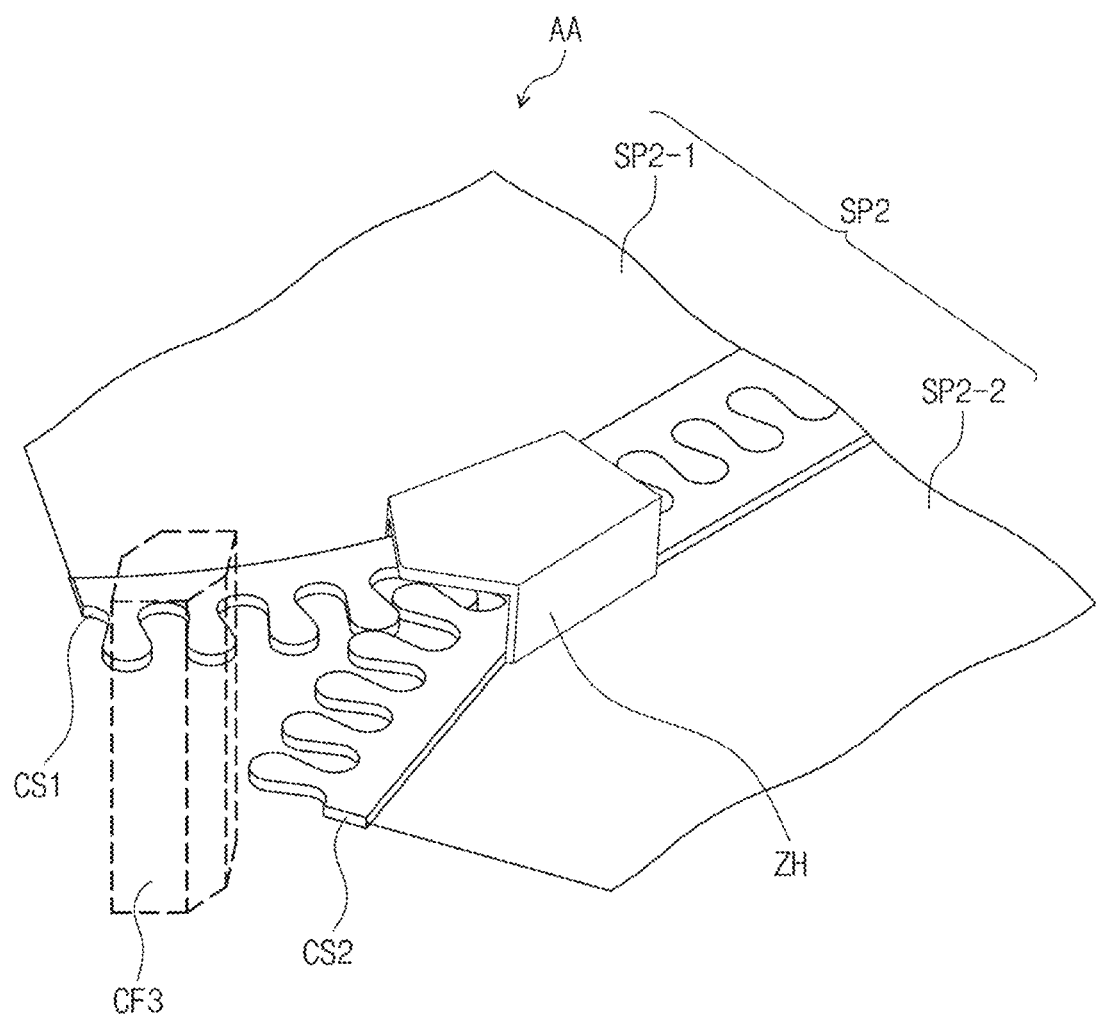
FIG. 7D is a perspective view of a coupling structure of a second film according to an embodiment of the disclosure.

FIGS. 7A to 7C are views showing a change in a state of a supporter SPT according to an embodiment of the disclosure, and FIG. 7D is a perspective view of a coupling structure of a second film SP2 according to an embodiment of the disclosure. More particularly, FIG. 7D is a view corresponding to the encircled portion AA of FIG. 7C.

Referring to FIGS. 7A to 7C, in an embodiment, a first coupling area CA1 of a support film SP may be defined outside a second support frame CF2 in the first direction DR1. A second coupling area CA2 of the support film SP may be defined outside a first arm AR1 in the second direction DR2, and a third coupling area CA3 of the support film SP may be defined outside a second arm AR2 in the second direction DR2.

In such an embodiment, the opening/closing areas SA1 and SA2 shown in FIGS. 2A to 3D may be omitted in the support film SP. A second edge area E1-2 (refer to FIG. 3B) of a first film SP1 and a second edge area E2-2 (refer to FIGS. 3B and 3C) of the second film SP2 may maintain the coupled state thereof regardless of the state of the display device DD. A third edge area E1-3 of the first film SP1 and a third edge area E2-3 (refer to FIGS. 3B and 3C) of the second film SP2 may also maintain the coupled state thereof regardless of the state of the display device DD.

In an embodiment, as a first state shown in FIG. 7A is changed to a second state shown in FIG. 7C, a first area SP2-1 and a second area SP2-2, which come out from the housing HS (refer to FIG. 6A), may increase. The first area SP2-1 and the second area SP2-2, which are disposed at one side of the third support frame CF3 in the first direction DR1, may be coupled to each other.

Referring to FIG. 7D, a first coupling structure CS1 may be disposed in the first area SP2-1, and a second coupling structure CS2 may be disposed in the second area SP2-2. The first coupling structure CS1 and the second coupling structure CS2 may be coupled to each other when the first state is changed to the second state and may be separated from each other when the second state is changed to the first state. In an embodiment, as shown in FIG. 7D, the first coupling structure CS1 may be a first zipper line, and the second coupling structure CS2 may be a second zipper line that may be coupled to the first zipper line.

The first zipper line and the second zipper line may be coupled to each other by a zipper slider ZH and may be separated from each other by the third support frame CF3.

Although not shown in figures, the zipper slider ZH may be fixed to the housing HS (refer to FIG. 6A).

According to an embodiment, the second support frame CF2 may apply a tensile stress to the first coupling area CA1 of the support film SP in the first direction DR1 in the second state shown in FIG. 7C. The first arm AR1 and the second arm AR2 may apply the tensile stress to the second coupling area CA2 and the third coupling area CA3 of the support film SP, respectively. Since the second coupling area CA2 and the third coupling area CA3 may maintain the coupled state thereof regardless of the state of the display device DD, defects such as deformation due to the applied tensile stress or loosening due to the applied tensile stress may be reduced.

Figure 8A:
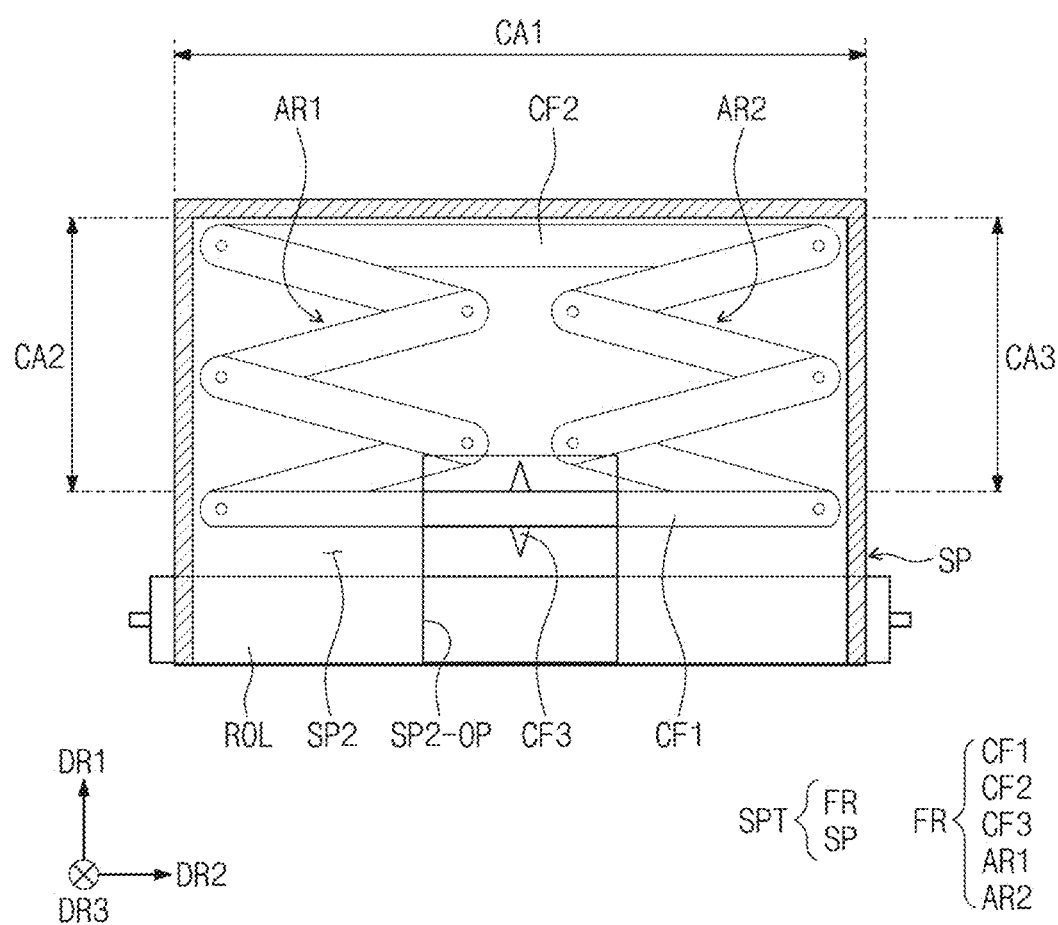
FIGS. 8A to 8C are views showing a change in a state of a supporter according to an embodiment of the disclosure.
Figure 8B:
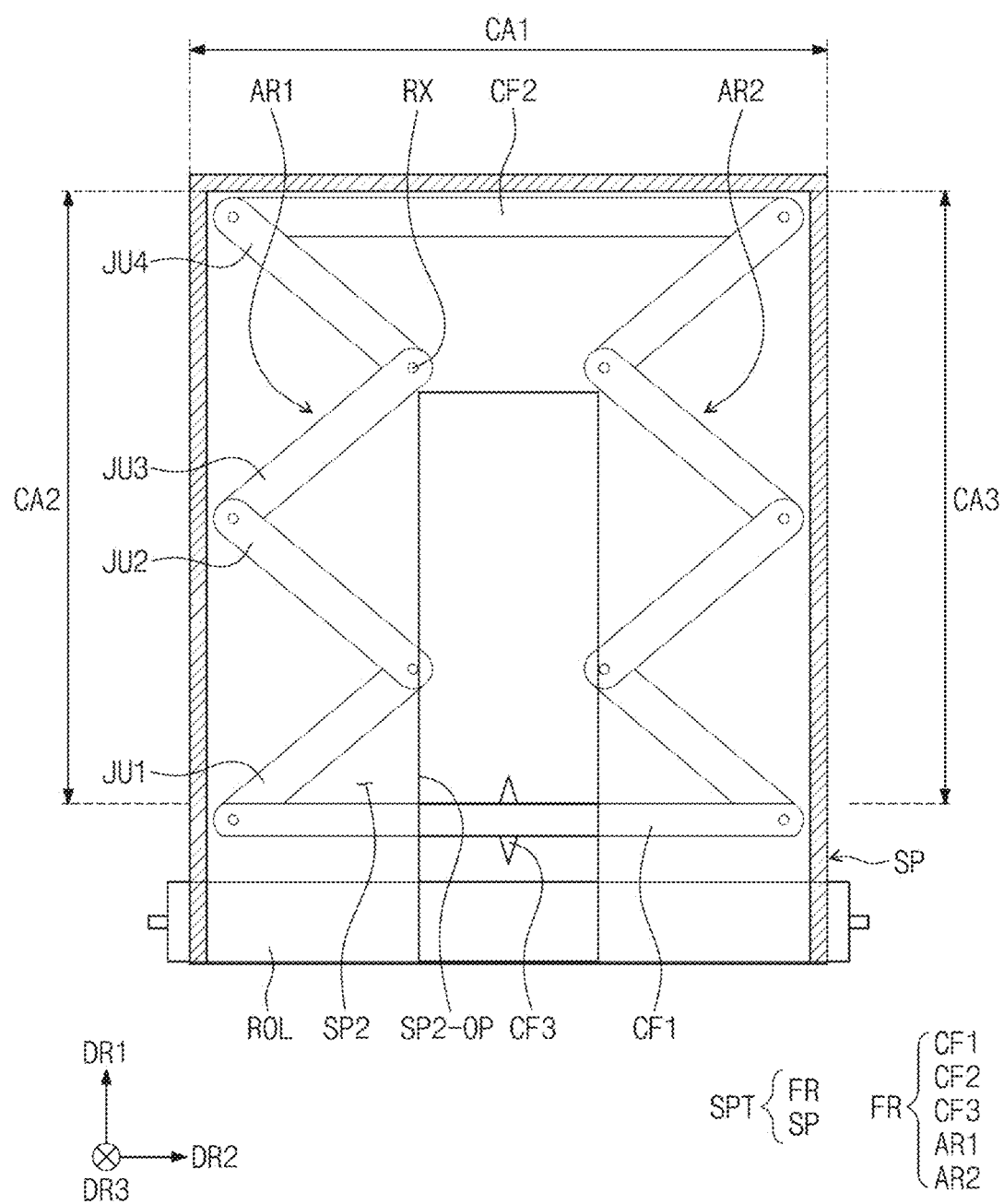
Figure 8C:
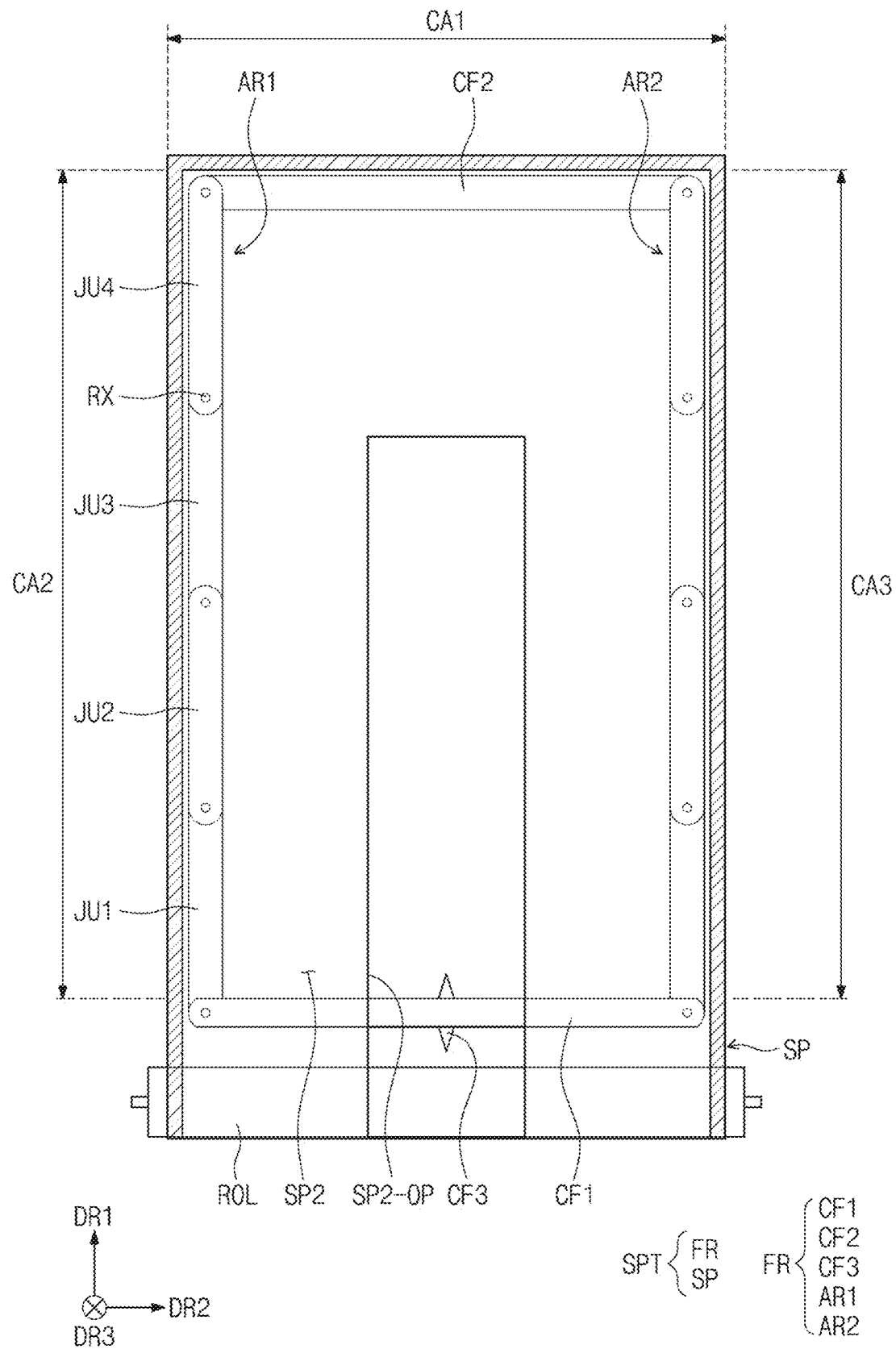

FIGS. 8A to 8C are views showing a change in a state of a supporter SPT according to an embodiment of the disclosure. Hereinafter, any repetitive detailed descriptions of the same elements as those of FIGS. 6A to 7D will be omitted.

According to an embodiment, the cutting line CL described with reference to FIGS. 6A to 7D may be replaced with an opening area SP2-OP. An opening area SP2-OP may be defined in a second film SP2.

A level of the tensile stress applied to a second coupling area CA2 and a third coupling area CA3 of a support film SP in a second state shown in FIG. 8C may correspond to that of the tensile stress applied to the support film SP shown in FIGS. 7A to 7C. in such an embodiment, since the first coupling structure CS1 and the second coupling structure CS2 shown in FIG. 7D may be omitted, a manufacturing cost may be reduced, and defects occurring when the first and second coupling structures CS1 and CS2 are coupled to or separated from each other may be prevented.

Figure 9A:
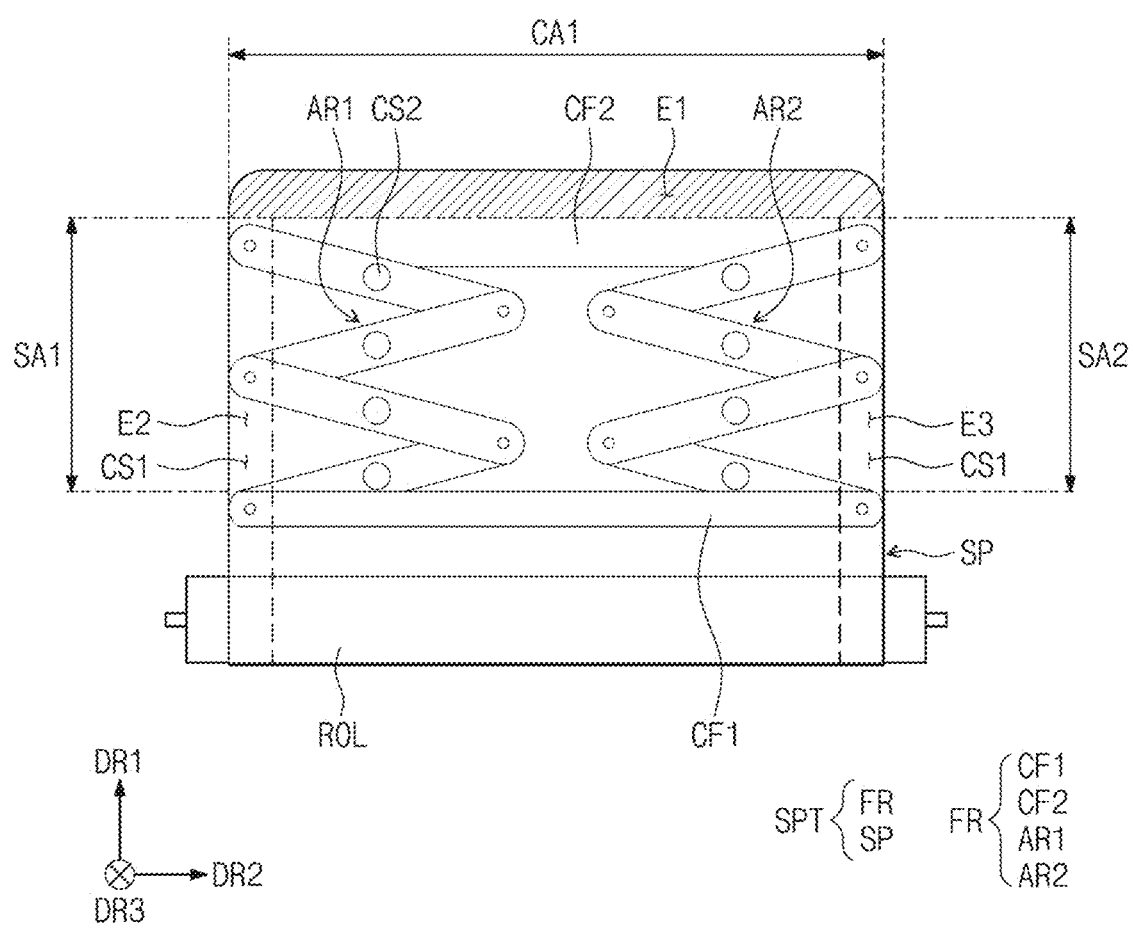
FIGS. 9A to 9C are views showing a change in a state of a supporter according to an embodiment of the disclosure.
Figure 9B:
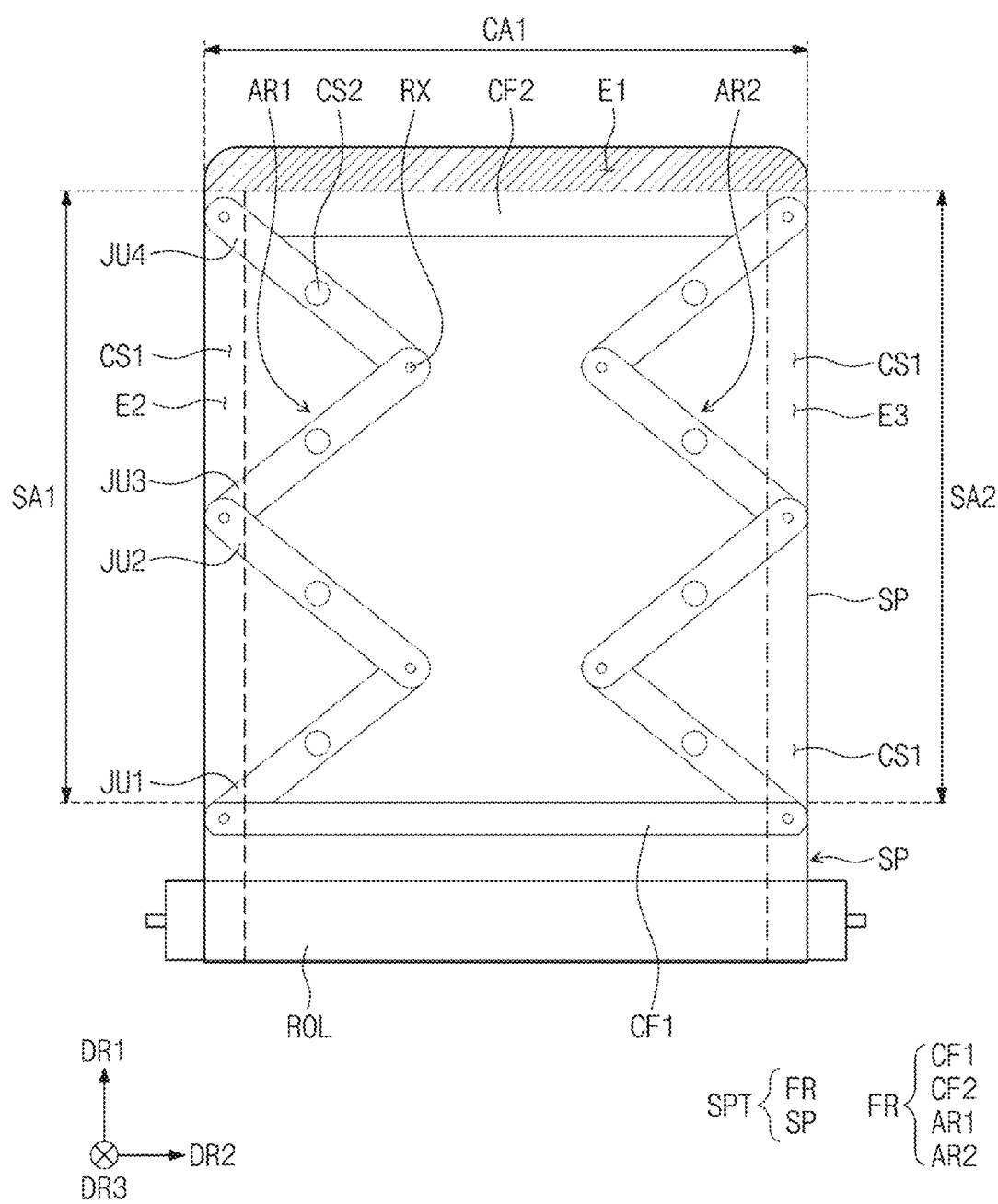
Figure 9C:
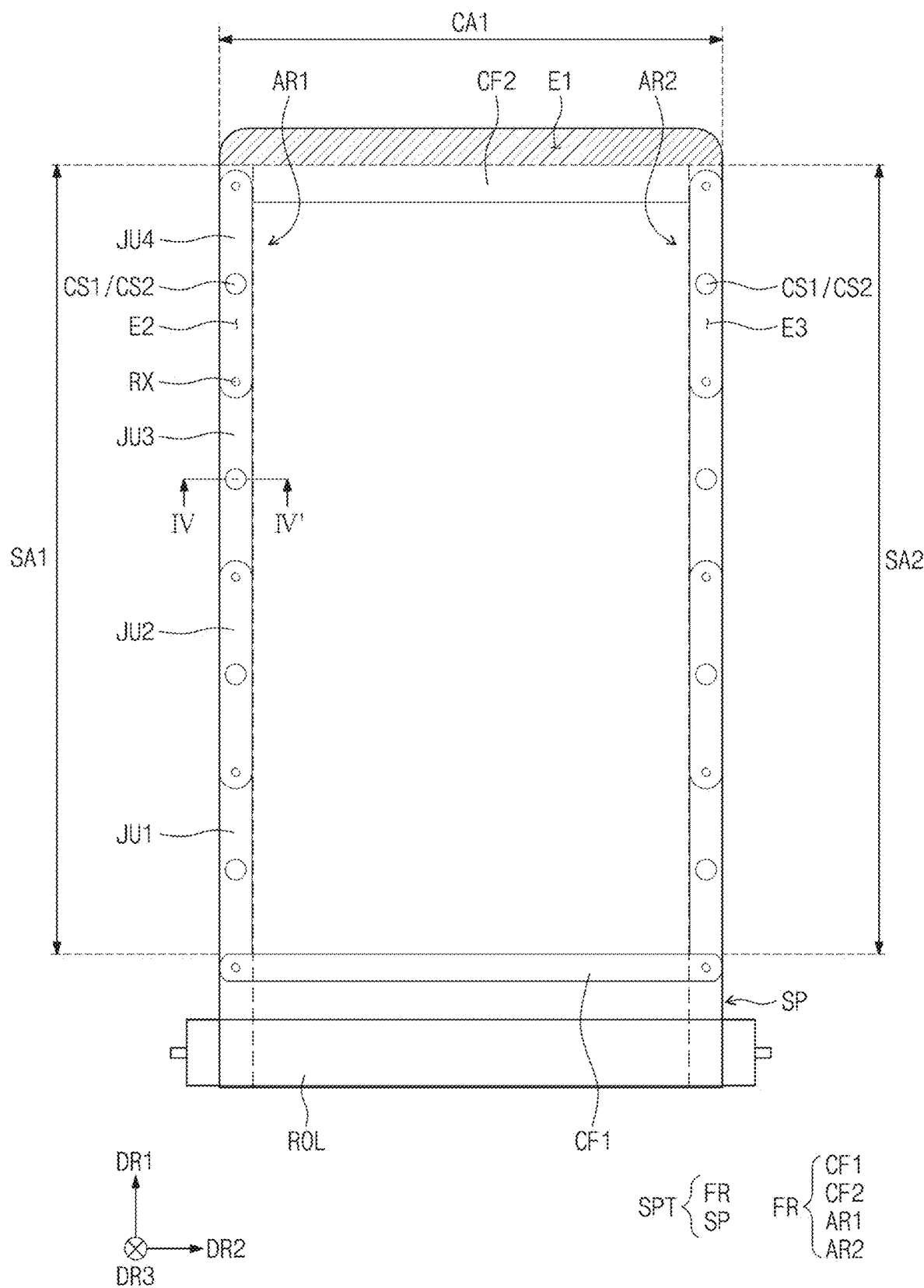
Figure 9D:
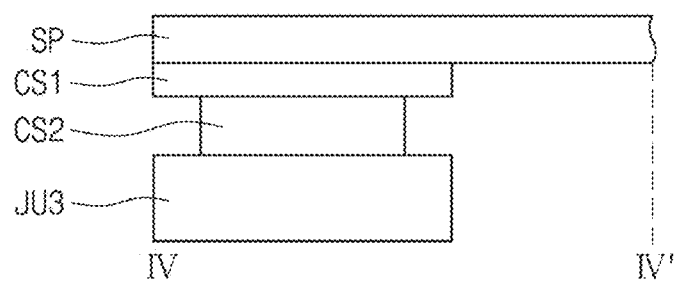
FIG. 9D is a cross-sectional view taken along line IV-IV' of FIG. 9C.

FIGS. 9A to 9C are views showing a change in a state of a display device DD according to an embodiment of the disclosure, and FIG. 9D is a cross-sectional view taken along line IV-IV' of FIG. 9C. Hereinafter, any repetitive detailed descriptions of the same elements as those of FIGS. 1A to 8C will be omitted.

According to an embodiment, a support film SP may include only one film or a single film. In such an embodiment, the above-described second film SP2 may be omitted, and the support film SP may include only a first film SP1.

The support film SP may be coupled to a second support frame CF2. A first edge area E1 of the support film SP may be coupled to the second support frame CF2. FIGS. 9A to 9C show an embodiment where the second support frame CF2 has an increased length in the first direction DR1 to overlap the first edge area E1 of the support film SP to secure a first coupling area CA1.

A first coupling structure CS1 may be disposed on the support film SP. The first coupling structure CS1 may include a metal layer disposed in a second edge area E2 and a third edge area E3 of the support film SP. The first coupling structure CS1 may be formed by coating or depositing a metal material on one surface of the support film SP. A width in the second direction DR2 of the metal layer may correspond to a width of first to fourth joint units JUT to JU4.

A second coupling structure CS2 may be disposed in each of a first arm AR1 and a second arm AR2. The second coupling structure CS2 may include a magnet or an electromagnet. The second coupling structure CS2 may be disposed in each of the first to fourth joint units JU1 to JU4. The magnet or electromagnet may be disposed on an upper surface of each of the first to fourth joint units JU1 to JU4. A cavity may be defined or formed in each of the first to fourth joint units JU1 to JU4 to accommodate the magnet or electromagnet.

In a second state shown in FIG. 9C, the metal layer of the second edge area E2 may be coupled to the magnet or electromagnet of the first arm AR1, and the metal layer of the third edge area E3 may be coupled to the magnet or electromagnet of the second arm AR2. FIG. 9D shows a cross-section of a coupled state of the first coupling structure CS1 and the second coupling structure CS2.

Due to the coupling of the first coupling structure CS1 and the second coupling structure CS2, a tensile stress may occur in the support film SP. A support force of the support film SP may increase.

Figure 10:
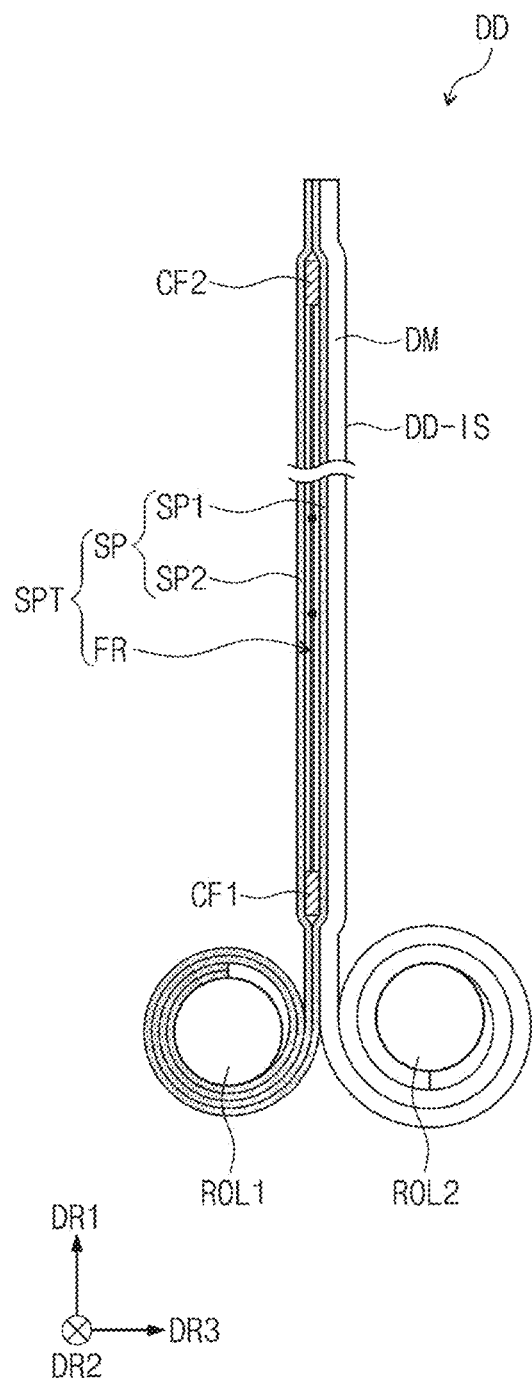
FIGS. 10 and 11 are side views of a display device according to an embodiment of the disclosure.
Figure 11:
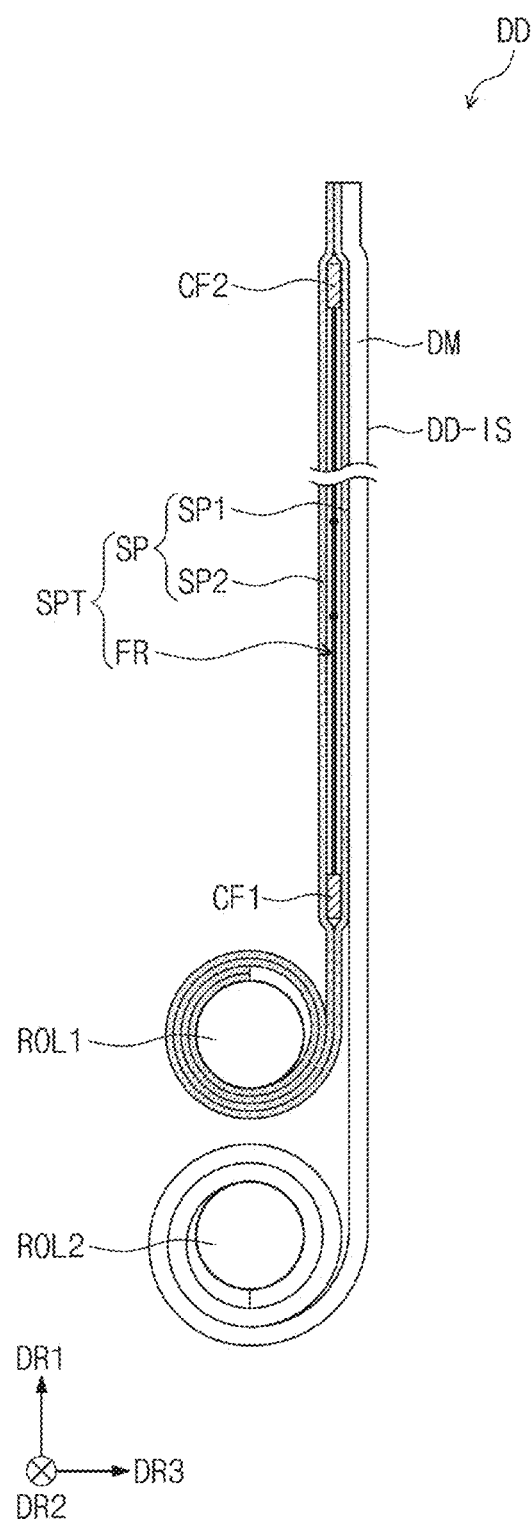

FIGS. 10 and 11 are side views of a display device DD according to an embodiment of the disclosure. In FIGS. 10 and 11, the holder HD and the housing HS are not shown for convenience of illustration.

According to an embodiment, the display device DD may include a plurality of rollers. A support film SP may be wound on a first roller ROL1, and a display module DM may be wound on a second roller ROL2. According to an embodiment, interference defects that may occur in a process of winding the support film SP and the display module DM onto a same roller may be prevented.

In an embodiment, as shown in FIG. 10, the first roller ROL1 and the second roller ROL2 may be spaced apart from each other in the third direction DR3. In an alternative embodiment, as shown in FIG. 11, the first roller ROL1 and the second roller ROL2 may be spaced apart from each other in the first direction DR1.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
  a housing;
  a display module accommodated in the housing in a first state and unrolled from the housing to a first direction in a second state;
  a support film accommodated in the housing in the first state and unrolled from the housing to the first direction in the second state to support the display module; and
  a frame shrinking to a first shape in the first state and expanding to a second shape in the second state,
  wherein the support film comprises:
    a first film; and
    a second film spaced apart from the first film with the frame interposed directly therebetween and disposed farther from the display module than the first film is,
  wherein the frame is configured to move between and independent of the first film and the second film.

2. The display device of claim 1, wherein the tensile stress is applied in the first direction and a second direction crossing the first direction.

3. The display device of claim 1, wherein the frame comprises:
  a first support frame disposed in the housing in the second state and extending in a second direction crossing the first direction;

a second support frame disposed outside the housing in the second state and spaced apart from the first support frame in the first direction;

a first arm connecting a first side of the first support frame to a first side of the second support frame; and a second arm connecting a second side of the first support frame to a second side of the second support frame, and a distance in the first direction between the first support frame and the second support frame increases by the first arm and the second arm when the first state is changed from the first state to the second state.

4. The display device of claim 3, wherein each of the first arm and the second arm comprises first to n-th joint units, and joint units adjacent to each other among the first to n-th joint units are rotatably coupled to each other, wherein n is a natural number equal to or greater than 2.

5. The display device of claim 4, wherein an internal angle defined by an (i+1)-th joint unit and an (i+2)-th joint unit among the first to n-th joint units is greater than about 180 degrees in the first state, and an internal angle defined by an i-th joint unit and the (i+1)-th joint unit among the first to n-th joint units is smaller than about 180 degrees in the first state, wherein i is a natural number equal to or greater than 1 and equal to or less than n−2.

6. The display device of claim 4, wherein each of the first to n-th joint units is aligned parallel to the first direction in the second state.

7. The display device of claim 3, wherein each of the first arm and the second arm comprises first to n-th joint units, and an i-th joint unit among the first to n-th joint units is coupled to an (i−1)-th joint unit among the first to n-th joint units, to be movable in the first direction in the second state, wherein n is a natural number equal to or greater than 2, and i is a natural number equal to or greater than 2 and equal to or less than n.

8. The display device of claim 7, wherein a first slit is defined in the first support frame, a first joint unit is coupled to the first slit to be movable, a second slit is defined in the second support frame, and the n-th joint unit is coupled to the second slit to be movable.

9. The display device of claim 8, wherein the first slit extends in a first crossing direction crossing the first direction and the second direction, the second slit extends in a second crossing direction crossing the first direction, the second direction and the first crossing direction, and a distance between the first slit and the second slit decreases as a distance from a center of the first support frame increases.

10. The display device of claim 3, wherein an edge area of the first film and an edge area of the second film, which are disposed outside the second support frame in the first direction, are coupled to each other in the first state and the second state.

11. The display device of claim 3, wherein a first edge area of the first film and a first edge area of the second film, which are disposed outside the first arm in the second direction, are separated from each other in the first state and are coupled to each other in the second state, and a second edge area of the first film and a second edge area of the second film, which are disposed outside the second arm in the second direction, are separated from each other in the first state and are coupled to each other in the second state.

12. The display device of claim 11, further comprising:

a first coupling structure disposed in the first edge area of the first film and a second coupling structure disposed in the first edge area of the second film, wherein the first coupling structure and the second coupling structure are separated from each other in the first state and are coupled to each other in the second state.

13. The display device of claim 12, wherein the first coupling structure and the second coupling structure are separated from each other by the first support frame when a state of the support film is changed from the second state to the first state.

14. The display device of claim 13, wherein a length in the second direction of the first support frame is greater than a length in the second direction of the first film, and the first support frame is installed in the housing.

15. The display device of claim 3, wherein a first edge area of the first film and a first edge area of the second film, which are adjacent to the second support frame in the first direction, are coupled to each other in the first state and the second state, a second edge area of the first film and a second edge area of the second film, which are disposed outside the first arm in the second direction, are coupled to each other in the first state and the second state, and a third edge area of the first film and a third edge area of the second film, which are disposed outside the second arm in the second direction, are coupled to each other in the first state and the second state.

16. The display device of claim 15, further comprising:

a third support frame which fixes the first support frame to the housing, wherein a cutting line is defined in the second film to be aligned with the third support frame, the second film comprises a first area and a second area arranged with the cutting line interposed therebetween in the second direction, and the first area and the second area are separated from each other in the first state and coupled to each other in the second state.

17. The display device of claim 16, further comprising:

a first coupling structure disposed in the first area and a second coupling structure disposed in the second area, wherein the first coupling structure and the second coupling structure are separated from each other in the first state and are coupled to each other in the second state.

18. The display device of claim 17, wherein the first coupling structure and the second coupling structure are separated from each other by the third support frame when a state of the second film is changed from the second state to the first state.

19. The display device of claim 17, further comprising:

a third support frame to fix the first support frame to the housing, wherein an opening area is defined in the second film, and the third support frame is disposed in the opening area.

20. The display device of claim 1, wherein each of the first film and the second film comprises a plastic, metal, or fiber material.

21. A display device comprising:
a housing;
a display module accommodated in the housing in a first state and unrolled from the housing to a first direction in a second state;
a support film accommodated in the housing in the first state and unrolled from the housing to the first direction in the second state to support the display module;
a frame shrinking to a first shape in the first state and expanding to a second shape in the second state in a way such that the frame applies a tensile stress to the support film in the second state, and
first coupling structures coupled to the support film, wherein the frame comprises:
 a first support frame disposed in the housing in the second state and extending in a second direction crossing the first direction;
 a second frame disposed outside the housing in the second state and spaced apart from the first support frame in the first direction;
 a first arm connecting a first side of the first support frame to a first side of the second support frame;
 a second arm connecting a second side of the first support frame to a second side of the second support frame; and
second coupling structures respectively disposed in the first arm and the second arm,
a distance in the first direction between the first support frame and the second frame increases by the first arm and the second arm when the first state is changed from the first state to the second state, and
the first coupling structures are respectively coupled to the second coupling structures in the second state.

22. The display device of claim 21, wherein
the support film comprises a first edge area and a second edge area opposite to the first edge area in the second direction,
the first coupling structures comprise a metal layer disposed in the first edge area and the second edge area, and
the second coupling structures comprise a magnet or an electromagnet.

23. The display device of claim 1, further comprising:
a roller installed in the housing,
wherein the support film is wound on the roller in the first state.

24. The display device of claim 23, wherein the display module is wound on the roller in the first state.

25. The display device of claim 23, wherein
the roller comprises a first roller and a second roller,
the support film is wound on the first roller in the first state, and
the display module is wound on the second roller in the first state.

* * * * *